United States Patent
Wang et al.

(10) Patent No.: US 10,664,925 B2
(45) Date of Patent: May 26, 2020

(54) SYSTEMS, METHODS AND ARTICLES FOR DETERMINING TAX RECOMMENDATIONS

(71) Applicant: Intuit Inc., Mountain View, CA (US)

(72) Inventors: Gang Wang, San Diego, CA (US); Luis F. Cabrera, Bellevue, WA (US); Kevin M. McCluskey, Carlsbad, CA (US); David A. Hanekamp, Jr., Carlsbad, CA (US)

(73) Assignee: INTUIT INC., Mountain View, CA (US)

( * ) Notice: Subject to any disclaimer, the term of this patent is extended or adjusted under 35 U.S.C. 154(b) by 308 days.

(21) Appl. No.: 14/755,684

(22) Filed: Jun. 30, 2015

(65) Prior Publication Data

US 2017/0004583 A1 Jan. 5, 2017

(51) Int. Cl.
*G06Q 40/00* (2012.01)

(52) U.S. Cl.
CPC .................. *G06Q 40/123* (2013.12)

(58) Field of Classification Search
USPC .................................................. 705/31, 36 T
See application file for complete search history.

(56) References Cited

U.S. PATENT DOCUMENTS

| | | |
|---|---|---|
| 4,213,251 A | 7/1980 | Foundos |
| 4,809,219 A | 2/1989 | Ashford et al. |
| 5,006,998 A | 4/1991 | Yasunobu |
| 5,495,607 A | 2/1996 | Pisello et al. |
| 5,557,761 A | 9/1996 | Chan et al. |
| 5,673,369 A | 9/1997 | Kim |
| 5,742,836 A | 4/1998 | Turpin et al. |

(Continued)

FOREIGN PATENT DOCUMENTS

| | | |
|---|---|---|
| JP | 2002-117121 A | 4/2002 |
| JP | 2005-190425 A | 7/2005 |

(Continued)

OTHER PUBLICATIONS

Godel's Completeness and Incompleteness Theorems by Eliezer Yudkowsky Dec. 25, 2012 (Year: 2012).*

(Continued)

*Primary Examiner* — William E Rankins
(74) *Attorney, Agent, or Firm* — DLA Piper LLP (US)

(57) ABSTRACT

Systems, methods and articles of manufacture for determining tax recommendations for a taxpayer by using a tax calculation graph to identify tax variables that a taxpayer can control and modify. The tax preparation system of comprises a recommendation engine configured to analyze a tax calculation graph which is calculated using tax data of the taxpayer. The recommendation engine determines tax variables from the tax calculation graph which can affect the tax result. The recommendation engine analyzes these tax variables to determine which of them can be reasonably controlled by the taxpayer using a controllability model. The recommendation engine then executes a tax calculation engine to calculate the tax calculation graph by varying the taxpayer controllable variables to determine how varying the user controllable variables affects the tax result. The recommendation engine then analyzes the affect on the tax result and determines one or more tax recommendation for the taxpayer.

22 Claims, 18 Drawing Sheets

(56) References Cited

U.S. PATENT DOCUMENTS

| | | |
|---|---|---|
| 5,819,249 A | 10/1998 | Dohanich |
| 6,078,898 A | 6/2000 | Davis |
| 6,535,883 B1 | 3/2003 | Lee et al. |
| 6,601,055 B1 | 7/2003 | Roberts |
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2* | 10/2010 | Allanson ............... G06Q 40/02 705/30 |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1 | 12/2011 | Brown et al. |
| 8,086,970 B2 | 12/2011 | Achtermann et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1* | 3/2013 | Eftekhari ............... G06Q 40/123 705/31 |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1* | 5/2013 | Talan ............... G06F 17/243 705/19 |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt et al. |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1* | 9/2017 | Wang ............... G06Q 40/123 |
| 9,916,628 B1 | 3/2018 | Wang et al. |
| 9,922,376 B1 | 3/2018 | Wang et al. |
| 9,990,678 B1 | 6/2018 | Cabrera et al. |
| 10,157,426 B1* | 12/2018 | Wang ............... G06F 16/248 |
| 10,235,721 B1* | 3/2019 | Cabrera ............... G06Q 40/123 |
| 10,387,969 B1* | 8/2019 | Wang ............... G06Q 40/123 |
| 2002/0065831 A1 | 5/2002 | DePaolo |
| 2002/0107698 A1 | 8/2002 | Brown et al. |
| 2002/0111888 A1 | 8/2002 | Stanley |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Ryder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |

(56) References Cited

U.S. PATENT DOCUMENTS

| | | |
|---|---|---|
| 2010/0036760 A1 | 2/2010 | Abeles |
| 2010/0088124 A1 | 4/2010 | Diefendorf et al. |
| 2010/0131394 A1 | 5/2010 | Rutsch et al. |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1* | 5/2012 | Eftekhari ............... G06F 21/31 705/31 |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1* | 3/2013 | Allanson ............... G06Q 40/02 705/31 |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1* | 3/2016 | Goldman ............ G06Q 40/123 705/31 |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0180470 A1* | 6/2016 | Mascaro ............ G06Q 10/0639 705/7.38 |
| 2016/0275627 A1* | 9/2016 | Wang ................... G06Q 40/123 |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).

(56) References Cited

OTHER PUBLICATIONS

Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
PCT International Search Report for PCT/US2016/039919, Applicant: Intuit Inc., Form PCT/ISA/210 and 220, dated Oct. 11, 2016 (6pages).
PCT Written Opinion of the International Search Authority for PCT/US2016/039919, Applicant: Intuit Inc., Form PCT/ISA/237, dated Oct. 11, 2016 (9pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snapshots/track-the-earnings-taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).

(56) References Cited

OTHER PUBLICATIONS

Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347,(2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Sep. 14, 2017 in U.S. Appl. No. 14/530,159, (41pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Vanderbilt University, "Free tax prep help available for Vanderbilt employees", Feb. 6, 2014, Vanderbilt University, p. 1-3.
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated June 27, 2017 in U.S. Appl. No. 14/755,859, (174pgs.).
Amendment and Response dated Nov. 27, 2017 in U.S. Appl. No. 14/755,859, (53pgs.).
Amendment and Response dated June 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).

(56) References Cited

OTHER PUBLICATIONS

Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).

(56) References Cited

OTHER PUBLICATIONS

Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Communication pursuant to Rules 70(2) and 70a(2) EPC dated Apr. 25, 2018 in European Patent Application No. 16843282.1-1217, (1page).
Solomon L. Pollack; Analysis of the Decision Rules in Decision Tables, May 1963; The Rand Corooration; pp. iii, iv, 1, 20, & 24 (Year: 1963).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/448,986 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
PCT International Search Report for PCT/US2017/062777, Applicant: Intuit Inc., Form PCT/ISA/210 and 220, dated: Feb. 21, 2018 (5pages).
PCT Written Opinion of the International Search Authority for PCT/US2017/062777, Applicant: The Regents of the University of California, Form PCT/ISA/237, dated: Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).

\* cited by examiner

| | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

FIG. 4

|       | $Q_A$ | $Q_B$ | $Q_C$ | $Q_D$ | $Q_E$ | $Q_F$ | $Q_G$ | STAT1 | STAT2 |
|-------|-------|-------|-------|-------|-------|-------|-------|-------|-------|
| Rule₁ | Y | ? | ? | ? | N | ? | ? | 40% | 10% |
| Rule₂ | N | Y | Y | ? | ? | ? | N | 20% | 5% |
| Rule₃ | N | Y | N | Y | ? | N | ? | 14% | 6% |
| Rule₄ | Y | ? | ? | ? | N | Y | N | 65% | 20% |
| Rule₅ | N | Y | N | ? | ? | ? | Y | 18% | 40% |
| Rule₆ | Y | Y | N | ? | ? | N | ? | 5% | 25% |

FIG. 5

SYSTEMS, METHODS AND ARTICLES FOR DETERMINING TAX RECOMMENDATIONS

SUMMARY

Embodiments of the present invention are directed to computerized systems, methods and articles for determining tax recommendations for a taxpayer, and more particularly to systems, methods and articles for determining tax recommendations utilizing a tax calculation graph used by a tax calculation engine to perform tax calculation operations.

The embodiments of the present invention may be implemented on and/or utilizing a tax return preparation system, or components thereof, comprising a tax preparation software application executing on a computing device. The tax return preparation system may operate on a new construct in which tax rules and the calculations based thereon are established in declarative data-structures, namely, completeness graph(s) and tax calculation graph(s). The tax calculation graph(s) comprise a plurality of nodes including input nodes, functional nodes, and function nodes which represent the tax operation used to perform a tax calculation in accordance with the applicable tax code and/or tax rules. The tax calculation graph(s) are also configured with a plurality of calculation paths wherein each calculation path connects a plurality of nodes which are data dependent such that a node is connected to another node if the node depends on the other node. Use of these data-structures permits the user interface to be loosely connected or even divorced from the tax calculation engine and the data used in the tax calculations. As used herein, the terms "engine," "module," and "element" are structural terms referring to a respective software application installed on a suitable hardware implementation, as would be known by those of ordinary skill in the art. These terms are not used as "nonce" words for the purpose of mean-plus-function claim elements. Tax calculations are dynamically calculated based on tax-related data that is input from a user, derived from sourced data, or estimated. A smart tax logic agent running on a set of rules can review current run time data and evaluate missing tax data necessary to prepare and complete a tax return. The tax logic agent proposes suggested questions to be asked to a user to fill in missing blanks. This process can be continued until completeness of all tax topics has occurred. A completed tax return (e.g., a printed tax return or an electronic tax return) can then be electronically prepared and filed (electronically and/or in paper form) with respect to the relevant taxing jurisdictions.

In another aspect of the tax return preparation system, the system is configured to operate the computing device to establish a connection to a data store configured to store user-specific tax data therein. The computing device executes a tax calculation engine configured to read and write tax calculation data to and from the shared data store, the tax calculation engine using one or more of the tax calculation graphs specific to particular tax topics. The computing device executes a tax logic agent, the tax logic agent reading from the shared data store and a plurality of decision tables collectively representing a completion graph for computing tax liability or a portion thereof, the tax logic agent outputting one or more suggestions for missing tax data based on an entry in one of the plurality of decision tables. The computing device executes a user interface manager configured to receive the one or more suggestions and present to a user one or more questions based on the one or more suggestions via a user interface, wherein a user response to the one or more questions is input to the shared data store. The user interface manager is configured to generate and display a question screen to the user. The question screen includes a question for the user requesting tax data for a taxpayer and is also configured to receive the tax data from the user in the form of input from the user. The user interface manager which receives the suggestion(s) selects one or more suggested questions to be presented to a user. Alternatively, the user interface manager may ignore the suggestion(s) and present a different question or prompt to the user.

In the event that all tax topics are covered, the tax logic agent, instead of outputting one or more suggestions for missing tax data may output a "done" instruction to the user interface manager. The computing device may then prepare a tax return for the taxpayer based on the data in the shared data store. The tax return may be a conventional paper-based return or, alternatively, the tax return may be an electronic tax return which can then be e-filed.

In one embodiment of the present invention, the tax preparation system is further configured to determine tax recommendations for the taxpayer. The present invention does not include any strategy for reducing, avoiding, or deferring tax liability, but instead provides tax recommendations to a user which the user may or may not implement. As such, the invention only provides advice and does not in any way limit the use of any tax strategy by any taxpayer or tax advisor. Indeed, any taxpayer or tax advisor would be free to use any of the tax recommendations provided by the present invention.

The tax preparation software application further comprises a recommendation engine. The recommendation engine is configured to analyze a tax calculation graph calculated based on tax data for a taxpayer and determine one or more tax variables which can affect the tax result (e.g., total tax owed, the amount of tax payment remaining, or refund) of the taxpayer. For example, the recommendation engine may analyze the tax calculation graph by traversing the calculation paths of the tax calculation graph and identify input nodes on the graph which can affect the tax result of the taxpayer. As an example, the recommendation engine may determine that the taxpayer may reduce its taxes owed by increasing retirement contributions, and identify a retirement contribution input node (e.g., 401(k) contribution) as a tax variable which can affect the tax result of the taxpayer.

The recommendation engine is further configured to analyze the identified tax variables to determine whether each tax variable is a taxpayer controllable variable. As an example, some tax variables are impossible or impracticable for a taxpayer to control, such as age, birth date, social security number, or disabilities. The recommendation engine may utilize a controllability model relating each tax variable to a level of tax payer controllability to determine whether a tax variable is controllable by the taxpayer, such as a heuristic graph or chart. For instance, the controllability model may be generated by human analysis, computer analysis of data, or a combination of both.

The recommendation engine is also configured to execute the tax calculation engine to calculate the calculation graph by varying the taxpayer controllable variables to determine an effect on the tax result. This may be done by varying one taxpayer controllable variable up and down around a known or estimated value while keeping the other variables constant, and determining the affect on the tax result. This can be repeated for each taxpayer controllable variable.

In another aspect of the present invention, the system may be configured to allow the user to select the taxpayer controllable variables of interest and/or predict how much each such tax variable will change. The system is configured to display to the user the taxpayer controllable variables determined by analyzing the calculated tax calculation graph and requests the user to select one or more of the taxpayer controllable variables. The system may also prompt the user to provide a change estimate or prediction of how much each taxpayer controller variables will change. The system receives the selections and/or estimates from the user. The recommendation engine then utilizes only the taxpayer controllable variables selected by the user in executing the tax calculation engine to calculate the tax calculation graph by varying the taxpayer controllable variables to determine an effect on the tax result by varying the taxpayer controllable variables. If provided, the recommendation engine also utilizes the change estimates in determining the effect on the tax result.

In another aspect, the tax preparation system is configured to provide the tax recommendations to a user. The tax preparation system is configured to generate a tax recommendation item for each of the tax recommendations. Each of the tax recommendation items includes its respective tax recommendation, meta data, a recommendation excerpt, and a confidence score indicating a measure of how likely the tax recommendation is to be implemented by to the taxpayer.

The recommendation engine then provides the tax recommendation items to the interface manager. The user interface manager may further comprises a recommendation processing element. The recommendation processing element generates a user interface presentation using the recommendation items. The system then displays the user interface presentation to the user.

In still another aspect, the tax preparation system may be configured to provide recurring, updated recommendations to the user, such as when the tax situation of the taxpayer changes and/or when the tax rules change. The tax preparation system further comprises a recommendation service for providing the recurring, updated recommendations to the user and/or a recommendation database for storing the tax recommendations. After determining the one or more tax recommendations and generating the tax recommendation items for each tax recommendation, as described above, the recommendation engine provides the tax recommendation items to the tax recommendation database which stores the tax recommendation items. Then, the recommendation service accesses the tax recommendations from the recommendation database and generates a user interface presentation. The recommendation service then dispatches the tax recommendations to the user, such as by displaying the user interface presentation to the user. In additional aspects, the tax preparation system updates the tax recommendations based upon receiving updated tax data regarding the taxpayer and/or new tax rules. For example, the system may receive feedback regarding the taxpayer implementing one or more of the tax recommendations previously provided to the user. The recommendation engine then determines updated tax recommendations and generates updated tax recommendation items for each updated tax recommendation based on the updated tax data and/or new tax rules.

In still another aspect, the system, including the user interface manager and/or the recommendation service, may also be configured to provide the tax recommendations to the user in a manner in which the user can adjust the values for the taxpayer controllable variables and obtain the tax result for the adjusted values. The system provide the tax recommendations to the user in the form of one or more adjustable input value controls in which each input value control is configured to allow the user to adjust an input value for a respective taxpayer controllable variable. Then, the recommendation engine receives the adjusted input value for one or more of the taxpayer controllable variables based on the user adjusting the one or more input value controls. The tax calculation engine calculates the tax calculation graph using the adjusted values for the taxpayer controllable variables resulting in a modified tax results and the system provides the modified tax result to the user.

Another embodiment of the present invention is directed to computer-implemented methods for providing tax recommendations for a taxpayer. For example, the method may include, a tax preparation system, same or similar to that described above, executing the recommendation engine to determine one or more tax recommendations and generating a tax recommendation item for each tax recommendation. The recommendation engine provides the tax recommendation items to the user interface manager. The user interface manager processes the tax recommendation items and generates a user interface presentation for displaying the recommendations to the user. The tax preparation system then displays the user interface presentation to the user.

In additional aspects of the present invention, the computer-implemented method may also include any of the additional aspects described herein for the system for providing tax recommendations for a taxpayer.

Another embodiment of the present invention is directed to an article of manufacture comprising a non-transitory computer readable medium embodying instructions executable by a computer to execute a process according to any of the method embodiments of the present invention for providing tax recommendations for a taxpayer. For instance, the non-transitory computer readable medium embodying instructions executable by a computer may be configured to execute a process comprising: a tax preparation system, same or similar to that described above, executing the recommendation engine to determine one or more tax recommendations and generating a tax recommendation item for each tax recommendation. The recommendation engine provides the tax recommendation items to the user interface manager. The user interface manager processes the tax recommendation items and generates a user interface presentation for displaying the recommendations to the user. The tax preparation system then displays the user interface presentation to the user.

In additional aspects, the article of manufacture may be further configured according to the additional aspects described herein for the system and/or method for determining tax recommendations for a taxpayer.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

FIG. 4 illustrates a decision table based on or derived from the completeness graph of FIG. 3.

FIG. 5 illustrates another embodiment of a decision table that incorporates statistical data.

DETAILED DESCRIPTION OF ILLUSTRATED EMBODIMENTS

Figure 1:
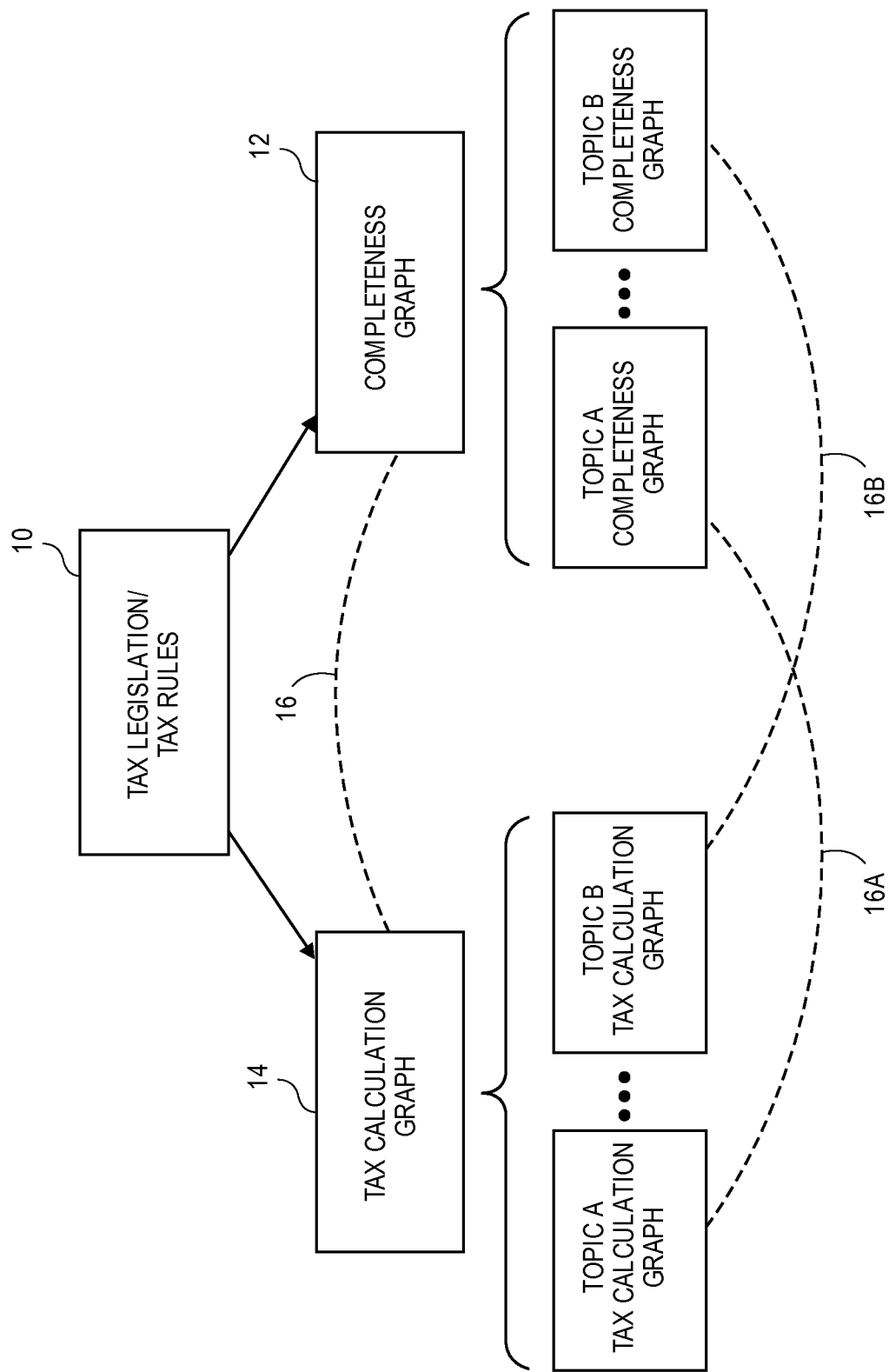
FIG. 1 schematically illustrates how tax legislation/tax rules are parsed and represented by a completeness graph and a tax calculation graph.

Embodiments of the present invention are directed to systems, methods and articles of manufacture for determining tax recommendations for a taxpayer by using a tax calculation graph to identify tax variables that a taxpayer can control and modify. The tax preparation system of the present invention comprises a recommendation engine configured to analyze a tax calculation graph which is calculated using tax data of the taxpayer. The recommendation engine determines tax variables (e.g., input nodes) in the tax calculation graph which can affect the tax result (e.g., total tax liability, the amount of tax payment remaining, or refund amount). The recommendation engine analyzes these tax variables to determine which of them can be reasonably controlled by the taxpayer using a controllability model which relates tax variables to a level of user controllability. The recommendation engine then executes a tax calculation engine to calculate the tax calculation graph by varying the taxpayer controllable variables to determine how varying the user controllable variables affects the tax result. The recommendation engine then analyzes the affect on the tax result and determines one or more tax recommendation for the taxpayer. As one example, the recommendation engine may determine that the taxpayer can increase a 401(k) retirement contribution and decrease the total tax liability, and therefore, may recommend that the taxpayer increase the 401(k) contribution from a current value to an increased value.

Tax preparation is a time-consuming and laborious process. It is estimated that individuals and businesses spend around 6.1 billion hours per year complying with the filing requirements of the United States federal Internal Revenue Code. Tax return preparation software has been commercially available to assist taxpayers in preparing their tax returns. Tax return preparation software is typically run on a computing device such as a computer, laptop, tablet, or mobile computing device such as a Smartphone. Traditionally, a user has walked through a set of rigidly defined user interface interview screens that selectively ask questions that are relevant to a particular tax topic or data field needed to calculate a taxpayer's tax liability.

In contrast to the rigidly defined user interface screens used in prior iterations of tax preparation software, the present design provides tax preparation software 100 that runs on computing devices 102, 103 (see FIG. 12) and operates on a new construct in which tax rules and the calculations based thereon are established in declarative data-structures, namely, completeness graph(s) and tax calculation graph(s). Completeness graphs 12 (see e.g. FIGS. 1-3) and tax calculation graphs 14 (see e.g. FIGS. 6A-6B) are data structures in the form of trees having nodes and interconnections between the nodes indicating interdependencies. Completeness graphs 12 identify each of the conditions (e.g. questions, criteria, conditions) which may be required to be satisfied to complete a particular tax topic or a complete tax return, and also identifies when all conditions have been satisfied to complete a particular tax topic or, a complete, file-able tax return. The tax calculation graphs 14 semantically describe data dependent nodes, including input nodes, functional nodes, functions, and tax operations, that perform tax calculations or operations in accordance with tax code or tax rules. Examples of these data structures are described in U.S. patent application Ser. Nos. 14/097,057 and 14/448,886, both of which are incorporated by reference as if set forth fully herein.

Use of these data-structures permits the user interface to be loosely connected or even detached from the tax calculation engine and the data used in the tax calculations. Tax calculations are dynamically calculated based on tax data derived from sourced data, estimates, user input, or even intermediate tax calculations that are then utilized for additional tax calculations. A smart tax logic agent running on a set of rules can review current run time data and evaluate missing data fields and propose suggested questions to be asked to a user to fill in missing blanks. This process can be continued until completeness of all tax topics has occurred. An electronic return can then be prepared and filed with respect to the relevant taxing jurisdictions.

FIG. 1 illustrates graphically how tax legislation/tax rules 10 are broken down into a completeness graph 12 and a tax calculation graph 14. In one aspect of the invention, tax legislation or rules 10 are parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, in one embodiment of the invention, each particular topic (e.g., topics A, B) may each have their own dedicated completeness graph 12A, 12B and tax calculation graph 14A, 14B as seen in FIG. 1.

Note that in FIG. 1, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completion graph 12. Taken collectively, the completeness graph 12 and the tax calculation graph 14 represent data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately print or file a tax return. The completeness graph 12 is used to determine when a particular schema contains sufficient information such that a tax return can be prepared and filed. Individual combinations of completeness graphs 12 and tax calculation graphs 14 that relate to one or more topics can be used to complete the computations required for some sub-calculation. In the context of a tax setting, for example, a sub-selection of topical completeness graphs 12 and tax calculation graphs 14 can be used for intermediate tax results such as Adjusted Gross Income (AGI) or Taxable Income (TI), itemized deductions, tax credits, and the like.

Figure 2:
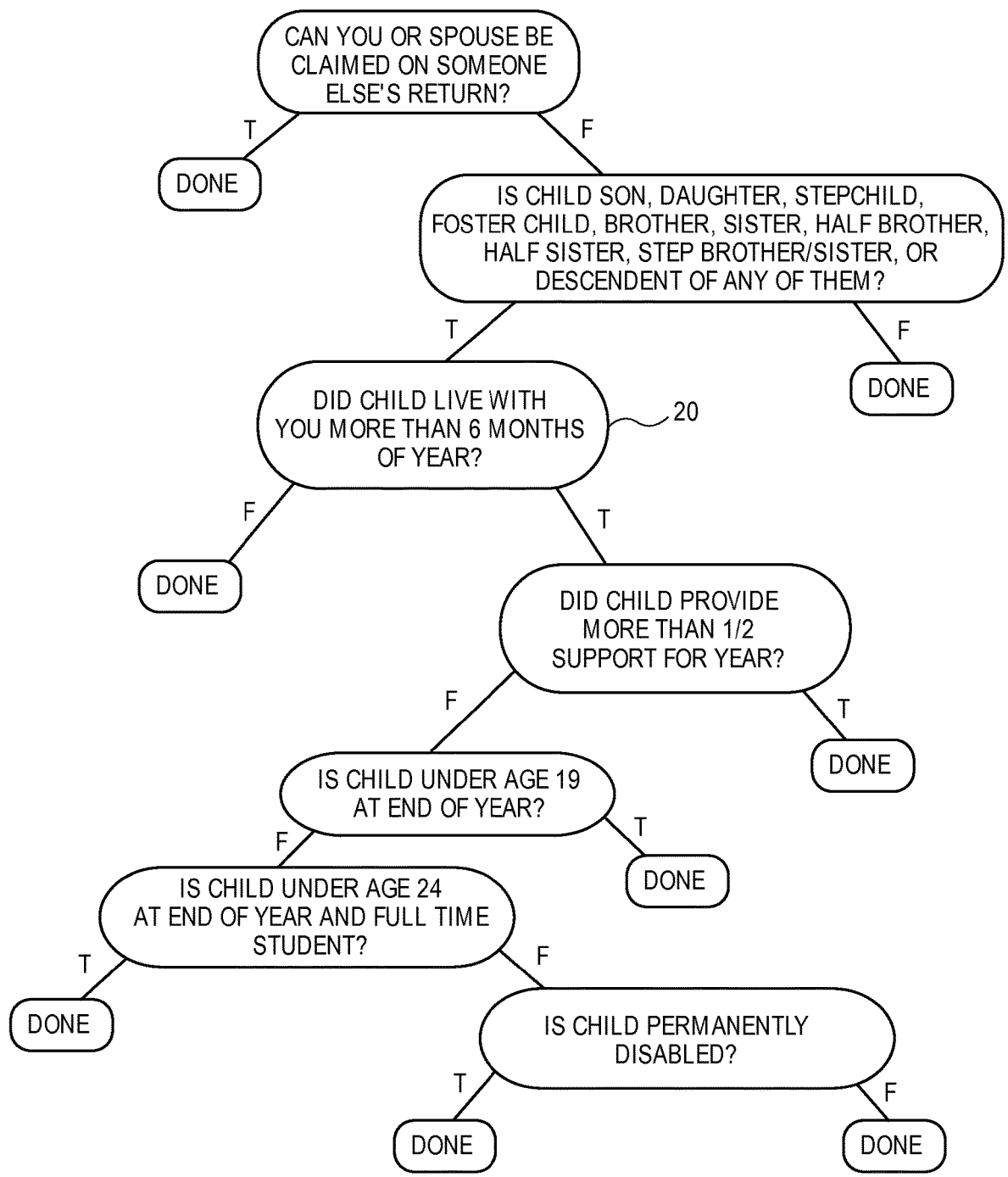
FIG. 2 illustrates an example of a simplified version of a completeness graph related to a qualifying child for purposes of determining deductions for federal income tax purposes.

The completeness graph 12 and the tax calculation graph 14 represent data structures that can be constructed in the form of a tree. FIG. 2 illustrates a completeness graph 12 in the form of a tree with nodes 20 and arcs 22 representing a basic or general version of a completeness graph 12 for the topic of determining whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, many branches or lines within the completeness graph 12 can be ignored, for example, when certain questions internal to the completeness graph 12 are answered that eliminate other nodes 20 and arcs 22 within the completeness graph 12. The dependent logic expressed by the completeness graph 12 allows one to minimize subsequent questions based on answers given to prior questions. This allows a minimum question set that can be generated and that can be presented to a user as explained herein.

Figure 3:
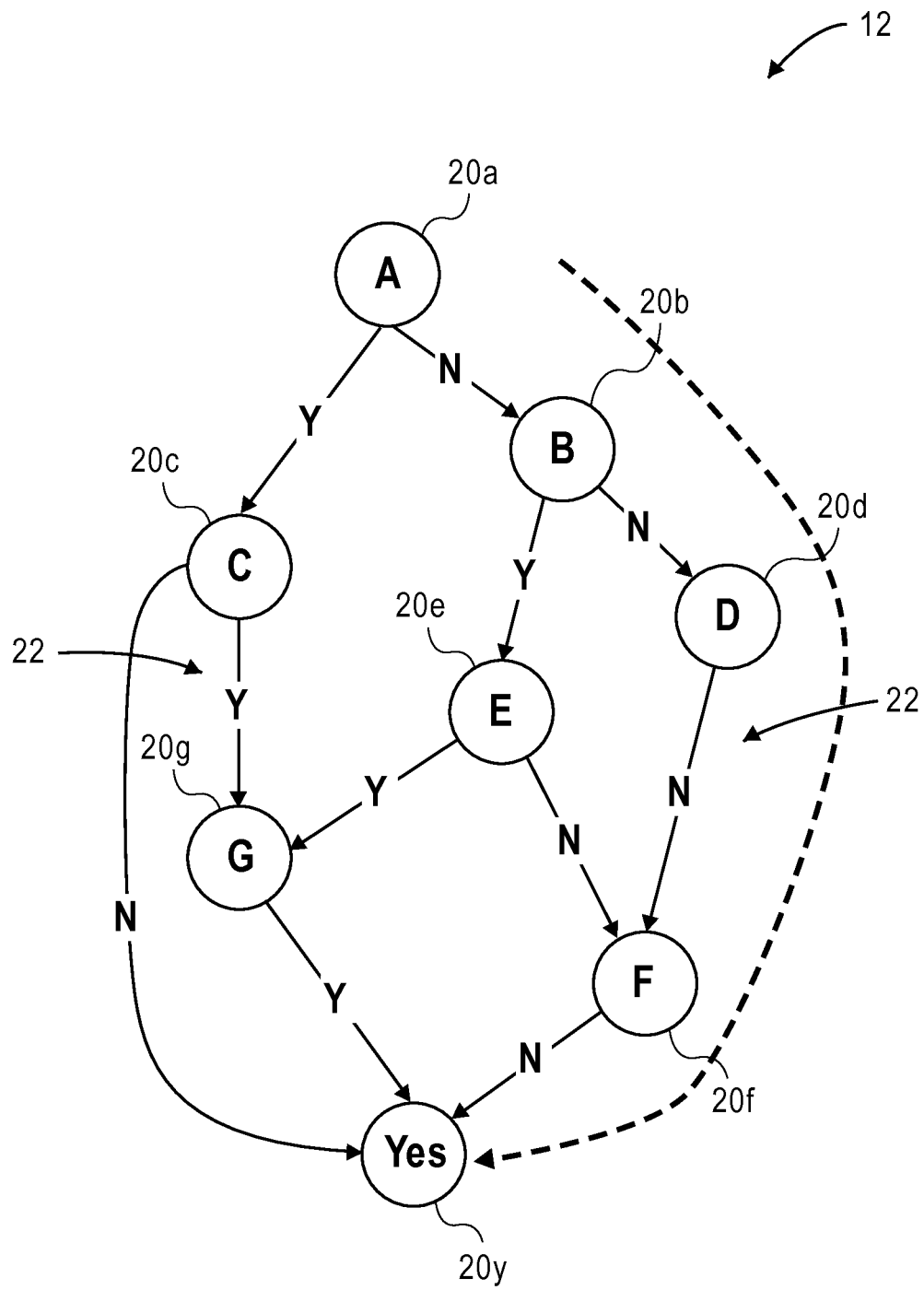
FIG. 3 illustrates another illustration of a completeness graph.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner, the system can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax preparation software 100. In particular, the decision table 30 is used to select a question or questions to present to a user during an interview process. In this particular example, in the context of the completeness graph from FIG. 3 converted into the decision table 30 of FIG. 4, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that are irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After an initial question has been presented and rows are eliminated as a result of the selection, next, a collection of candidate questions from the remaining available rows 32*a* and 32*b* is determined. From this universe of candidate questions from the remaining rows, a candidate question is selected. In this case, the candidate questions are questions $Q_C$ and $Q_G$ in columns 34*c*, 34*g*, respectively. One of these questions is selected and the process repeats until either the goal 34*h* is reached or there is an empty candidate list.

FIG. 5 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified into one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38*a*, 38*b* in the decision table 30 that contain statistical data 36 in the form of percentages. For example, column 38*a* (STAT1) may contain a percentage value that indicates taxpayers under the age of thirty-five where $Rule_1$ is satisfied. Column 38*b* (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax preparation software 100 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Figure 6A:
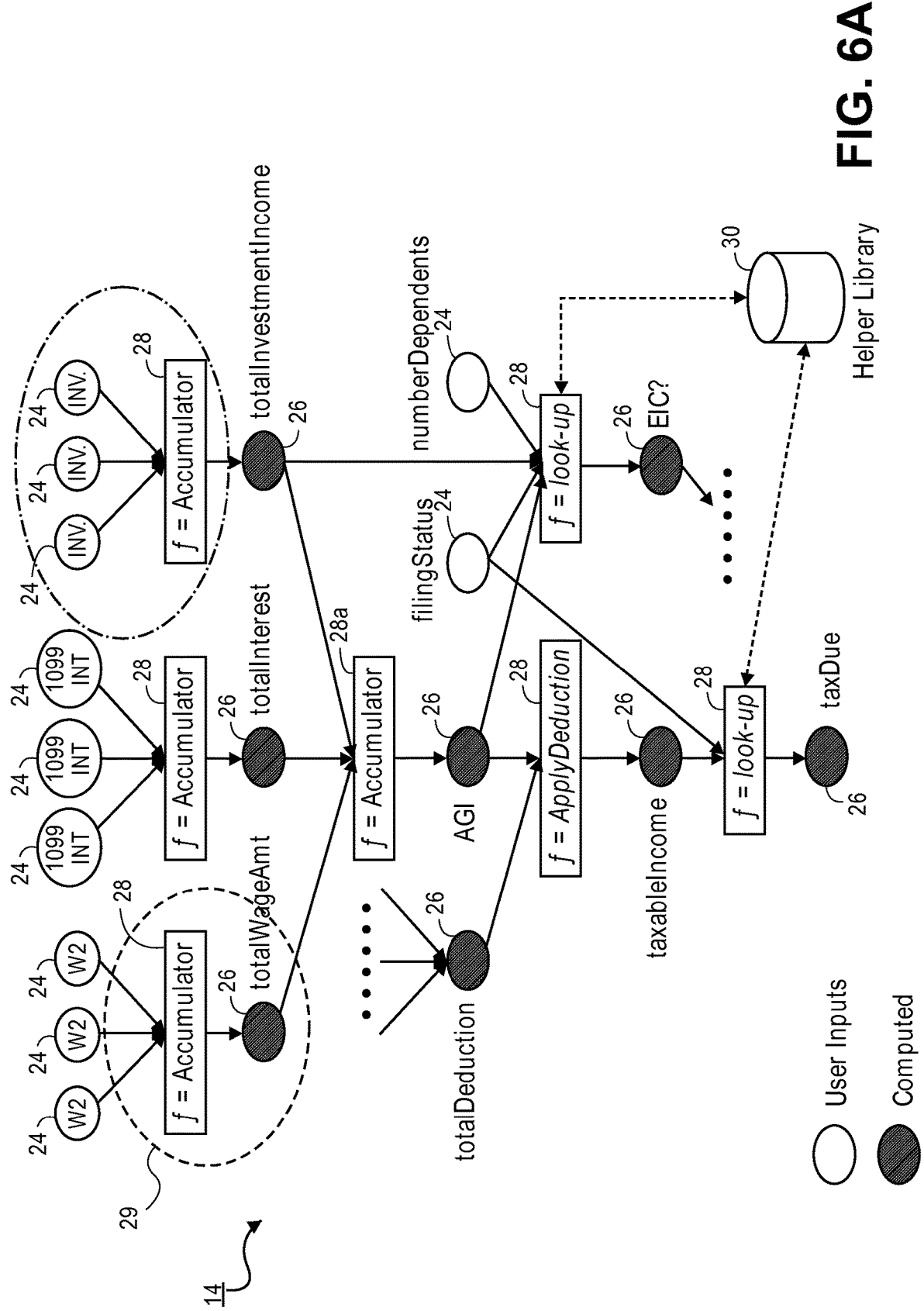
FIG. 6A illustrates an example of a tax calculation graph according to one embodiment.
Figure 6B:
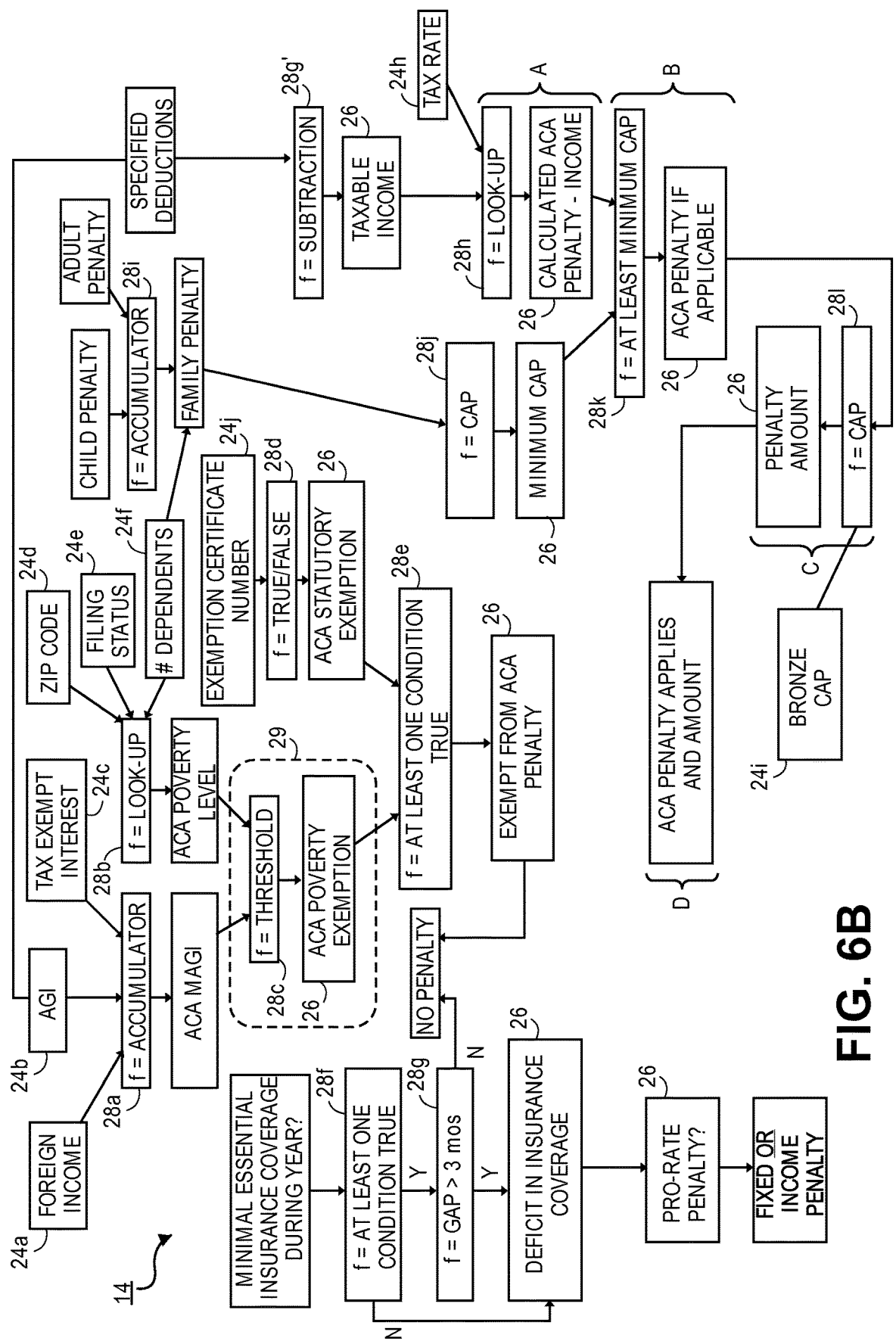
FIG. 6B illustrates an example of a calculation graph that relates to the determination and calculation of a shared responsibility penalty under the Affordable Care Act according to one embodiment.

FIGS. 6A and 6B illustrate two examples of tax calculation graphs 14. The tax calculation graph 14 semantically describes data dependent tax operations that are used to perform a tax calculation in accordance with the tax code or tax rules 10. The tax calculation graphs 14 in FIGS. 6A and 6B are a simplified view of data dependent tax operations that are used to determine the taxes Due (taxDue) based on various sources of income, deductions, exemptions, and credits. The tax calculation graph 14 is a type of directed graph (which may be composed of a plurality of directed graphs) and, in most situations relevant to tax calculations, is a directed acyclic graph that encodes the data dependencies amongst tax concepts or topics.

In FIG. 6A, various nodes 24 are leaf or input nodes. Examples of leaf nodes 24 in this particular example include data obtained from W-2 forms, data obtained from 1099-INT forms, data obtained from other investment income (INV), filing status, and number of dependents. Typically, though not exclusively, leaf nodes 24 are populated with user inputs. That is to say the user (e.g. a taxpayer) will enter this information from a user interface as described herein. In other embodiments, however, the leaf nodes 24 may be populated with information that is automatically obtained by the tax preparation software 100. For example, in some embodiments, tax documents may be imaged or scanned with relevant data being automatically extracted using Object Character Recognition (OCR) techniques. In other embodiments, prior tax returns may be used by the tax preparation software 100 to extract information (e.g., name, potential dependents, address, and social security number) which can then be used to populate the leaf nodes 24. Online resources such as financial services websites or other user-specific websites can be crawled and scanned to scrape or otherwise download tax related information that can be automatically populated into leaf nodes 24. Additional third party information sources such as credit bureaus, government databases, and the like can also be used by the tax preparation software 100 to obtain information that can then be populated in to respective leaf nodes 24.

In still other embodiments, values for leaf nodes 24 may be derived or otherwise calculated. For example, while the number of dependents may be manually entered by a taxpayer, those dependents may not all be "qualifying" dependents for tax purposes. In such instances, the actual number of "qualified" dependents may be derived or calculated by the tax preparation software 100. In still other embodiments, values for leaf nodes 24 may be estimated as described herein.

Still other internal nodes, referred to as functional nodes 26, semantically represent a tax concept and may be calculated or otherwise determined using a function node 28 (also referred to as a "function 28"). The functional node 26 and the associated function 28 define a particular tax operation 29. For example, as seen in FIG. 6A, tax operation 29 refers to total wage income and is the result of the accumulator function 28 summing all W-2 income from leaf nodes 24. The functional node 26 may include a number in some instances. In other instances, the functional node 26 may include a response to a Boolean expression such as "true" or "false." The functional nodes 26 may also be constant values in some instances. Some or all of these functional nodes 26 may be labeled as "tax concepts" or "tax topics." The combination of a functional node 26 and its associated function 28 relate to a specific tax operation 29 as part of the tax topic.

Interconnected functional node 26 containing data dependent tax concepts or topics are associated with a discrete set of functions 28 that are used to capture domain specific patterns and semantic abstractions used in the tax calculation. The discrete set of functions 28 that are associated with any particular functional node may be commonly re-occurring operations for functions that are used throughout the process of calculating tax liability. For instance, examples of such commonly reoccurring functions 28 include copy, capping, thresholding, accumulation or adding, look-up operations, phase out calculations, comparison calculations, exemptions, exclusions, and the like.

In one embodiment, the entire set of functions 28 that is used to compute or calculate a tax liability is stored within a data store 30 which in some instances may be a database. The various functions 28 that are used to semantically describe data connections between functional nodes 26 can be called upon by the tax preparation software 100 for performing tax calculations. Utilizing these common functions 28 greatly improves the efficiency of the tax preparation software 100 and can be used by a programmer to more easily track and follow the complex nature of the ever-evolving tax code. The common functions 28 also enable easier updating of the tax preparation software 100 because as tax laws and regulations change, fewer changes need to be made to the software code as compared to prior hard-wired approaches.

Importantly, the tax calculation graph 14 and the associated functional nodes 26 and function nodes 28 can be tagged and later be used or called upon to intelligently explain to the user the reasoning behind why a particular tax result changed or did not change between a first set of tax data and a second set of tax data having one or more different values, as explained in more detail below. The functions 28 can be de-coupled from a specific narrow definition and instead be associated with one or more explanations. Examples of common functions 28 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plans. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

In some embodiments, the function node 28 may include any number of mathematical or other operations. Examples of functions 28 include summation, subtraction, multiplication, division, and look-ups of tables or values from a database 30 or library as is illustrated in FIG. 6A. It should be understood that the functional node 26 within completion graph 12 and the tax calculation graph 14 may be shared in some instances. For example, AGI is a re-occurring tax concept that occurs in many places in the tax code. AGI is used not only for the mathematical computation of taxes but is also used, for example, to determine eligibility of certain tax deductions and credits. Thus, the AGI node is common to both the completion graph 12 and the tax calculation graph 14.

FIG. 6B illustrates an example of a tax calculation graph 14 that is used to calculate the amount of penalty under the Affordable Care Act (ACA). Under the ACA, taxpayers are required to have minimum essential health coverage for each month of the year, qualify for an exemption, or make a shared responsibility penalty payment when filing his or her federal tax return. FIG. 6B illustrates a flowchart illustration of a process used to calculate a taxpayer's shared responsibility payment under the ACA (referred to herein as an ACA penalty). FIG. 6B illustrates, for example, various leaf nodes 24a-24j used as part of this calculation to determine the ACA penalty. Leaf nodes 24a-24f are used to calculate the modified adjusted gross income (ACA MAGI) as well as the applicable ACA poverty level. One can see how the accumulator function 28a is used to generate the ACA MAGI in this example by adding foreign income 14a, AGI 24b, and tax exempt interest 24c. Likewise, a look-up function 28b can be used to determine the applicable ACA poverty level based on the taxpayer's zip code 24d, filing status 24e, and number of dependents 24f. The ACA MAGI and the ACA poverty level are then subject to a thresholding function 28c to determine whether the ACA poverty level exemption applies. Under the ACA, if a taxpayer cannot afford basic coverage because the minimum amount one must pay for the premiums exceeds a percentage of household income (i.e., 8%), one is exempt from obtaining minimum essential coverage.

Still referring to FIG. 6B, a taxpayer may be exempt from the requirement to obtain minimum essential coverage by obtaining a different statutory exemption. These exemptions include: religious conscience, health care sharing ministry, a member of Indian tribe, short coverage gap (less than 3 consecutive months), hardship, affordability (already mentioned above), incarceration, and not lawfully present. A true/false Boolean function 28d may be used to determine whether an Exemption Certificate Number (ECN) has been obtained from the taxpayer certifying that one of the statutory exemptions has been satisfied. Another threshold function 28e is applied to determine whether one of the statutory exemptions is satisfied (e.g., affordability or others). If at least one of these statutory conditions is met then the taxpayer is exempt from the ACA shared responsibility payment penalty.

As seen in FIG. 6B, if a taxpayer has obtained minimal essential coverage during the year, there is still the possibility that a penalty may be owed because under the ACA, if there is a gap in coverage for a covered member of the family of more than three (3) months, at least some penalty amount is owed. Function 28f (at least one condition true) is used to determine if there was minimum essential coverage during the year for any period. Function 28g (gap>3 months) is used to determine the gap in coverage in order to gaps in coverage that exceed the 3 month statutory requirement. The gap in coverage penalty, however, may be pro-rated based on the length of the gap in coverage as indicated in FIG. 6B.

In the event there is a penalty, the ACA requires that the penalty be the greater of a percentage of income, net of specified deductions, or a specified penalty that is applied per individual or family. For example, for the 2015 year, the percentage is 2.0 percent and increases to 2.5 percent in subsequent years. FIG. 6B illustrates the use of a subtraction function 28g that utilizes the AGI node 24b to arrive at a taxable income value. A look-up function 28h is used to obtain the applicable tax rate (e.g., 2.0% for 2015) and is used to calculate the income-based ACA penalty.

In order to determine the non-income or "fixed" penalty, an accumulator function 28i is used to determine the penalty. In this example, the calculation pertains to a family wherein the penalty includes a fixed amount for a child ($162.50 per child in 2015) and a fixed amount per adult ($325.00 per adult). Under the ACA, there is a maximum cap of this fixed penalty. For example, in 2015, the maximum family penalty is $975. As seen in FIG. 6B, a cap function 28j is used to determine the minimum cap. Another function 28k that is referred to as "at least minimum cap" is used to determine the greater of the fixed penalty or the income-based penalty. If the income-based penalty is higher than the fixed amount then that value is used, otherwise the fixed penalty amount is used. Still referring to FIG. 6B, another cap function 28l is used to determine whether the penalty has exceeded another cap that is part of the ACA law. Under the ACA, the overall penalty is capped at the national average premium for a bronze level insurance plan. The cap function 28*l* is used to ensure that the calculated penalty (i.e., the income based penalty) does not exceed this amount. After application of the cap function 28*l*, the ACA penalty amount is determined.

As seen in FIG. 6B, there are a variety of different functions 28 that are employed as part of the process used to calculate any applicable penalty under the ACA. In some instances, a common function (e.g., cap functions 28*j* and 28*l*) is found in multiple locations within the tax calculation graph 14. It should be understood that the functions 28 illustrated in FIG. 6B are illustrative as other functions may be used beyond those specifically illustrated in the drawings.

Figure 7:
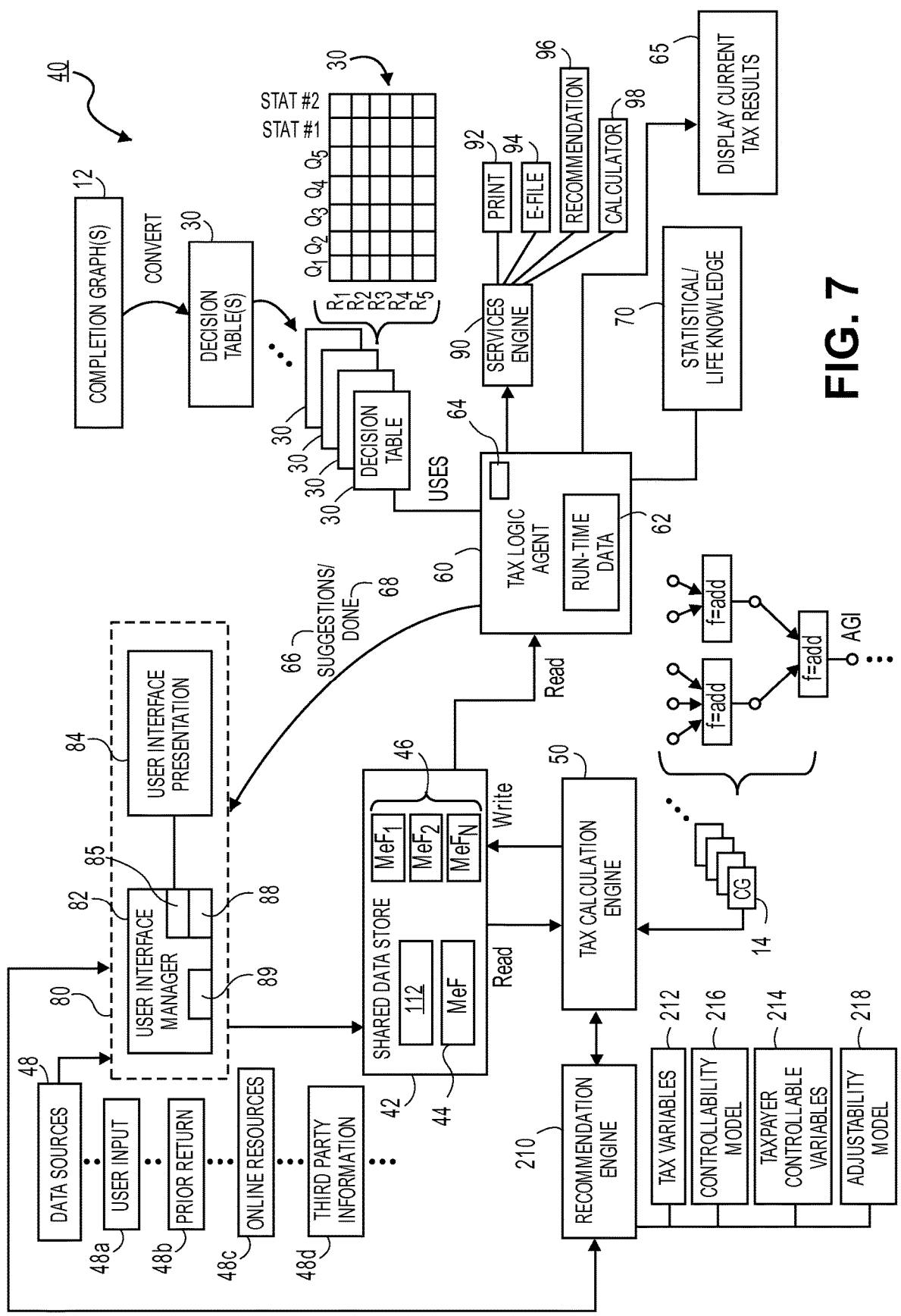
FIG. 7 schematically illustrates a tax preparation system for calculating taxes using rules and calculations based on declarative data structures, and for performing a tax recommendation function, according to one embodiment.

FIG. 7 schematically illustrates a tax return preparation system 40 for calculating taxes using rules and calculations based on declarative data structures according to one embodiment. The system 40 includes a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a computing device 102, 103 as described herein (e.g., FIG. 12). The shared data store 42 may be located on the computing device 102, 103 running the tax preparation software 100 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax preparation software 100 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44.

The schema 44 may be a modified version of the MeF schema used by the IRS. For example, the schema 44 may be an extended or expanded version (designated MeF++) of the MeF model established by government authorities that utilizes additional fields. While the particular MeF schema 44 is discussed herein the invention is not so limited. MeF and MeF+++ are only examples of tax agency standards for electronic filing of tax returns, and the present invention is not limited to any particular standard. Accordingly, any references to MeF or MeF++ in the specification or drawings includes any suitable standard for electronic filing of tax returns.

There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 (for MeF++ schema) stored therein at any particular time. For example, FIG. 7 illustrates several instances 46 of the MeF schema 44 (labeled as $MeF_1$, $MeF_2$, $MeF_N$). These instances 46 may be updated as additional data is input into the shared data store 42.

As seen in FIG. 7, the shared data store 42 may import data from one or more data sources 48. A number of data sources 48 may be used to import or otherwise transfer tax related data to the shared data store 42. This may occur through a user interface control 80 as described herein or, alternatively, data importation may occur directly to the shared data store 42 (not illustrated in FIG. 7). The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related day may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits. Tax related information may also pertain to medical insurance information. For example, under the new ACA many taxpayers may obtain health insurance through a state or federal marketplace. Such a marketplace may have information stored or accessible that is used in connection with preparing a tax return. Tax information related to premiums paid, coverage information, subsidy amounts (if any), and enrolled individuals can be automatically imported into the shared data store 42.

For example, user input 48*a* is one type of data source 48. User input 48*a* may take a number of different forms. For example, user input 48*a* may be generated by a user using, for example, an input device such as keyboard, mouse, touchscreen display, voice input (e.g., voice to text feature), photograph or image, or the like to enter information manually into the tax preparation software 100. For example, as illustrated in FIG. 7, user interface manager 82 contains an import module 89 that may be used to select what data sources 48 are automatically searched for tax related data. Import module 89 may be used as a permission manager that includes, for example, user account numbers and related passwords. The UI control 80 enables what sources 48 of data are searched or otherwise analyzed for tax related data. For example, a user may select prior year tax returns 48*b* to be searched but not online resources 48*c*. The tax data may flow through the UI control 80 directly as illustrated in FIG. 7 or, alternatively, the tax data may be routed directly to the shared data store 42. The import module 89 may also present prompts or questions to the user via a user interface presentation 84 generated by the user interface manager 82. For example, a question may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48*a* may also include some form of automatic data gathering. For example, a user may scan or take a photographic image of a tax document (e.g., W-2 or 1099) that is then processed by the tax preparation software 100 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior year tax return 48*b*. A prior year tax return 48*b* that is stored electronically can be searched and data is copied and transferred to the shared data store 42. The prior year tax return 48*b* may be in a proprietary format (e.g., .txt, .pdf) or an open source format. The prior year tax return 48*b* may also be in a paper or hardcopy format that can be scanned or imaged whereby data is extracted and transferred to the shared data store 42. In another embodiment, a prior year tax return 48*b* may be obtained by accessing a government database (e.g., IRS records).

An additional example of a data source 48 is an online resource 48*c*. An online resource 48*c* may include, for example, websites for the taxpayer(s) that contain tax-related information. For example, financial service providers such as banks, credit unions, brokerages, investment advisors typically provide online access for their customers to view holdings, balances, and transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48*c* beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?". Additional follow-up questions can then be presented to the user.

Still referring to FIG. 7, another data source 48 includes sources of third party information 48*d* that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48*d* include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities. Third party resources 48*d* may also include one of the state-based health insurance exchanges or the federal health insurance exchange (e.g., www.healthcare.gov).

Figure 12:
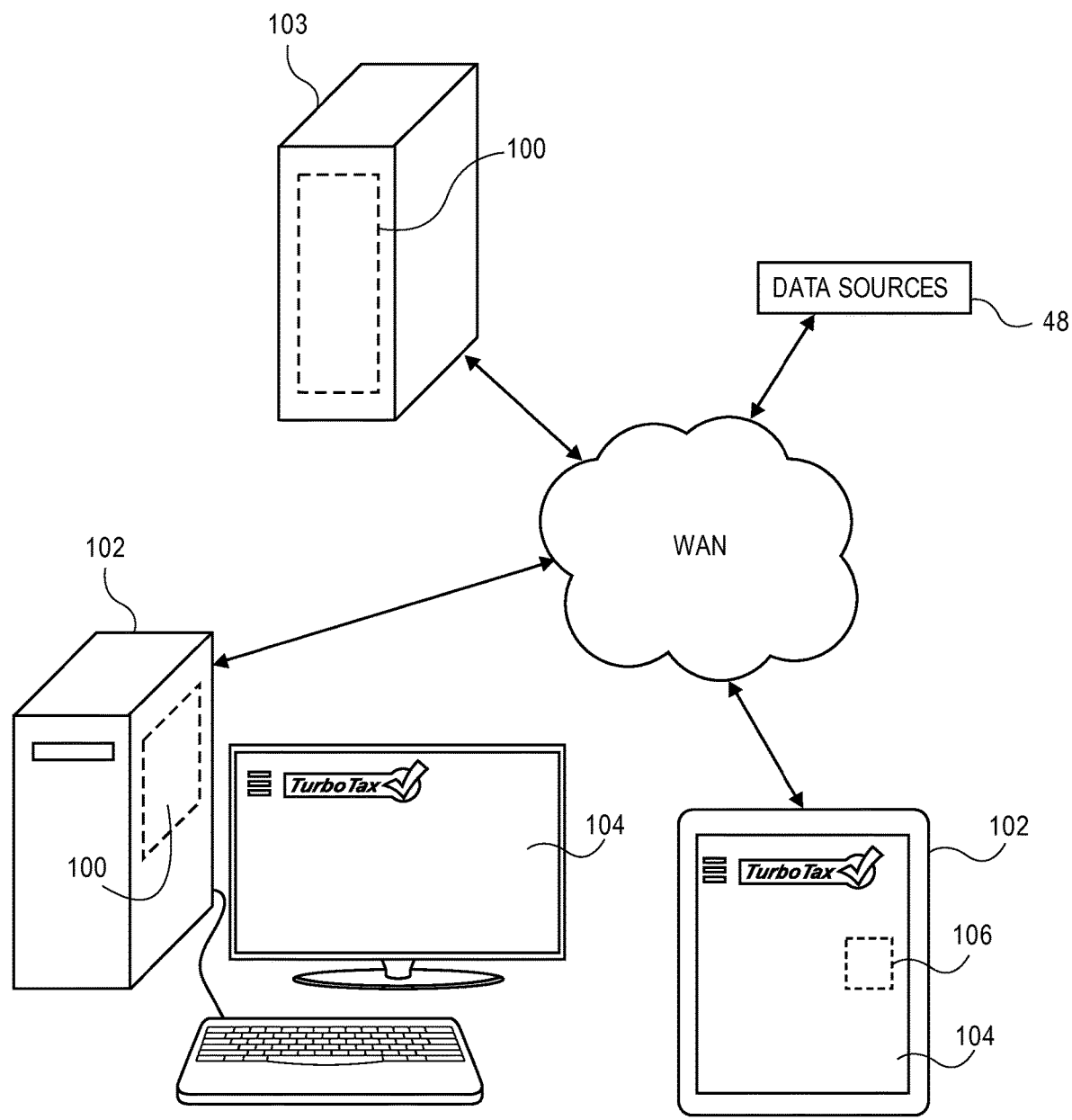
FIG. 12 illustrates the implementation of tax preparation software on various computing devices.

Referring briefly to FIG. 12, the tax preparation software 100 including the system 40 of FIG. 7 is executed by the computing device 102, 103. Referring back to FIG. 7, the tax return preparation software 100 executed by the computing device 102, 103 includes a tax calculation engine 50 that computes one or more tax calculations based on the tax calculation graph(s) 14 and the available data at any given instance within the schema 44 in the shared data store 42. The tax calculation engine 50 may calculate a final tax due amount (i.e. tax liability), a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 1, 6A and 6B. In one embodiment, a series of different calculation graphs 14 are used for respective tax topics. These different calculation graphs 14 may be coupled together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation). Tax calculations include, for example, the ACA penalty that is described in FIG. 6B as one illustrative example.

Still referring to FIG. 7, the system 40 includes a tax logic agent (TLA) 60. The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form of a Drools expert engine. Other declarative rules engines 64 may be utilized and a Drools expert rule engine 64 is provided as one example of how embodiments may be implemented. The TLA 60 may be implemented as a dedicated module contained within the tax preparation software 100.

As seen in FIG. 7, the TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, in which case, as explained in more detail below, the UI control 80 presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing or compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules:

```
Rule engine (64)/ Tax Logic Agent (TLA) (60)
    // initialization process
    Load_Tax_Knowledge_Base;
Create_Fact_Cache; While (new_data_from_application)
    Insert_data_into_fact_cache;
        collection = Execute_Tax_Rules; // collection is all the fired
rules and corresponding conditions
        suggestions = Generate_suggestions (collection);
        send_to_application(suggestions);
```

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. More specifically, the statistical/life knowledge module may comprise tax correlation data regarding a plurality of tax matter correlations. Each of the tax matter correlations quantifies a correlation between a taxpayer attribute and a tax related aspect. For instance, a taxpayer attribute could be taxpayer age which may be correlated to a tax related aspect such as having dependents, or a taxpayer attribute might be taxpayer age which may be correlated to homeownership or other relevant tax related aspect. The tax correlation data also quantifies the correlations, such as by a probability of the correlation. For instance, the correlation between the taxpayer attribute and the tax related aspect may be a certain percentage probability, such as 10%, 20%, 30%, 40%, 50%, 60%, or any percentage from 0% to 100%. Alternatively, the quantification can be a binary value, such as relevant or not relevant.

In other words, for a given taxpayer attribute, it may be determined that a tax related aspect is relevant or completely not relevant when a taxpayer has the given taxpayer attribute. As an example, if the taxpayer attribute is that the taxpayer is married, the correlation may indicate that spouse information is relevant and will be required.

The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(b) retirement accounts. This information may then be used by the TLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer.

Still referring to FIG. 7, the UI controller 80 encompasses a user interface manager 82 and a user interface presentation or user interface 84. The user interface presentation 84 is controlled by the interface manager 82 and may manifest itself, typically, on a visual screen or display 104 that is presented on a computing device 102 (seen, for example, in FIG. 12). The computing device 102 may include the display of a computer, laptop, tablet, mobile phone (e.g., Smartphone), or the like. Different user interface presentations 84 may be invoked using a UI generator 85 depending, for example, on the type of display or screen 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, which is responsible for resolving how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may comprise pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on the fly during runtime.

As seen in FIG. 7, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax preparation software 100 using an input device that is associated with the computing device. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be requested from the taxpayer. For example, with regard to donated goods, the taxpayer may be prompted to explain what the donated goods are and describe the same in sufficient detail to satisfy requirements set by a particular taxing authority.

Still referring to FIG. 7, in one aspect, the TLA 60 outputs a current tax result 65 which can be reflected on a display 104 of a computing device 102, 103. For example, the current tax result 65 may illustrate a tax due amount or a refund amount. The current tax results 65 may also illustrate various other intermediate calculations or operations used to calculate tax liability. For example, AGI or TI may be illustrated. Deductions (either itemized or standard) may be listed along with personal exemptions. Penalty or tax credits may also be displayed on the computing device 102, 103. This information may be displayed contemporaneously with other information, such as user input information, or user interview questions or prompts or even narrative explanations.

The TLA 60 also outputs a tax data that is used to generate the actual tax return (either electronic return or paper return). The return itself can be prepared by the TLA 60 or at the direction of the TLA 60 using, for example, the services engine 90 that is configured to perform a number of tasks or services for the taxpayer. The services engine 90 is operatively coupled to the TLA 60 and is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare and analyze differences between previous tax years.

By using calculation graphs 14 to drive tax calculations and tax operations, it is possible to determine interdependencies of the nodes (including tax operations, functional nodes and function nodes) and the year-over-year calculation graphs 14 can be used to readily identify differences and report the same to a user. Differences can be found using commonly used graph isomorphism algorithms over the two respective calculation graphs 14.

As shown in FIG. 7, the tax preparation system 40 also includes a recommendation engine 210 for determining tax recommendations for a taxpayer. The recommendation engine 210 may operate within the tax preparation software 100, or it may be a separate software application operating independent of the tax preparation software 100, or it may be a separate software program operatively coupled with the tax preparation software 100. As generally described above, the recommendation engine 210 is configured to execute a tax recommendation function which analyzes a calculated tax calculation graph 14, and determines tax recommendations which the taxpayer may implement for a current or future tax year.

The tax preparation system 40 may be configured in various ways to allow a user to utilize the tax recommendation functionality. As some examples, for a web-based tax preparation system 40 in which a user accesses and uses the system 40 through the Internet using a web browser, the user may utilize the tax recommendation function by logging in to the system and then selecting a tax recommendation function. In another way, the tax preparation system 40 may be configured to send an email or other electronic communication to the user asking if the user wants to obtain tax recommendations for the current tax year or a future tax year. The tax recommendation function may also be accessed using text messages, such as SMS or MMS, similar to email. The tax recommendation function may also be configured as a mobile device application, in which the user executes the application on a mobile device such as a smartphone, and the application interfaces with the tax preparation system 40 to utilize the tax estimate function. Accordingly, the tax preparation system 40 is configured with interfaces for any of the various modes of utilizing the tax recommendation function.

Figure 8:
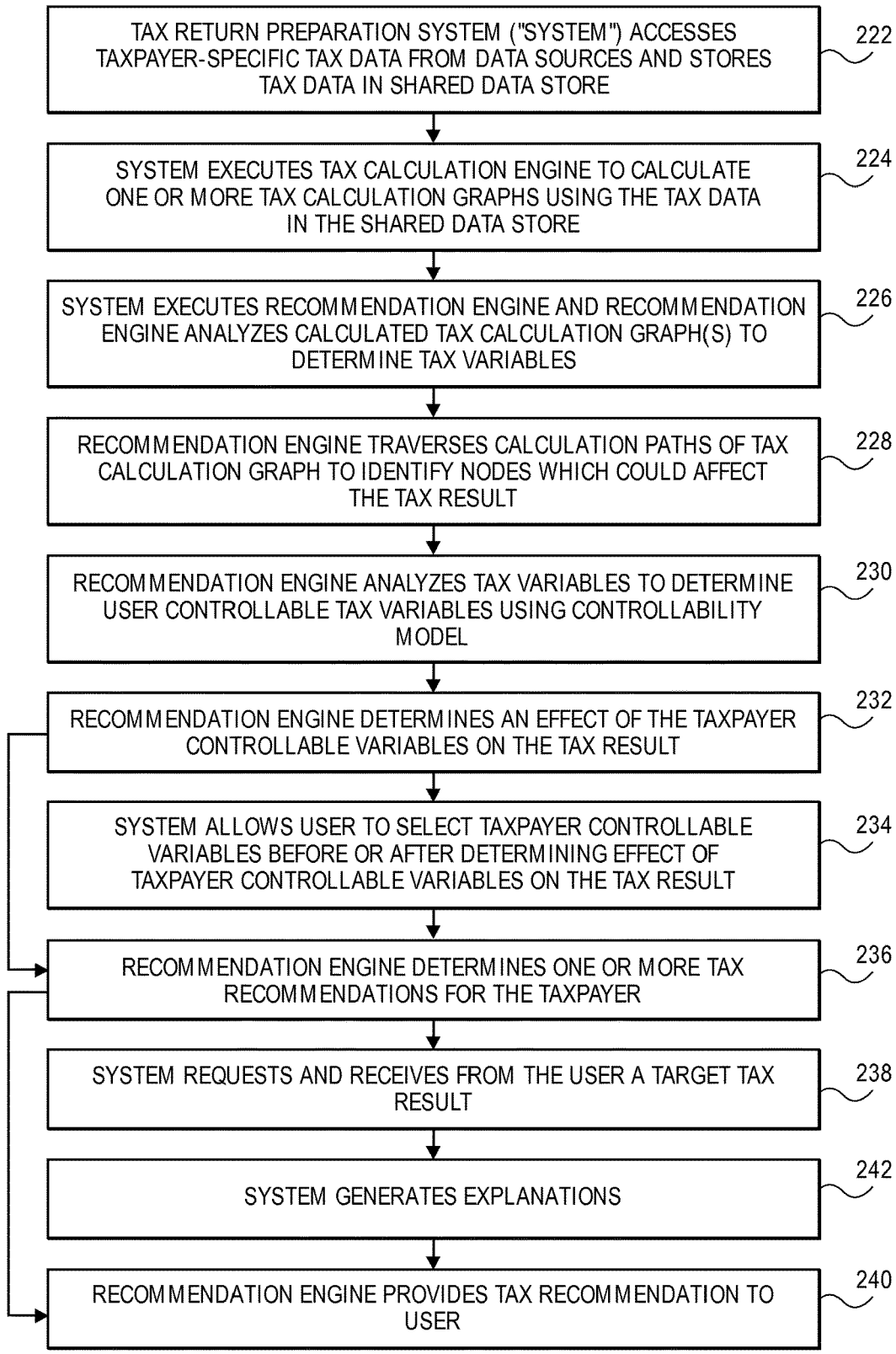
FIG. 8 is a flow chart of a method for determining tax recommendations for a taxpayer using a the tax preparation system having a tax recommendation engine.

Referring to FIG. 8, in one embodiment, a method 220 for determining a tax recommendation for a taxpayer is shown. At step 222, in order to enable the tax recommendation functionality, the tax preparation system 40 accesses tax data for a taxpayer by any of the methods and data sources 48 as described herein. The system 40 stores the tax data in the shared data store 42. At step 224, the system 40 executes the tax calculation engine 50 to calculate one or more tax calculation graphs 14 using the tax data as described herein.

At step 226, the system 40 then executes the recommendation engine 210. The recommendation engine 210 is configured to analyze the calculated tax calculation graph(s) 14 to determine one or more tax variables 212 which can affect the tax result of the tax calculation, such as the total tax owed by the taxpayer, the amount of tax payment owed after applying payments previously made, or the tax refund due to the taxpayer. The recommendation engine 210 is configured to traverse the calculation paths of the tax calculation graph(s) 14 to identify nodes (e.g., input nodes 24, function nodes 26 and/or functional nodes 28) on the tax calculation graph(s) 14 which if modified could affect the tax result of the taxpayer. These identified input nodes 24 constitute tax variables 212 which can affect the tax result of the tax calculation.

The recommendation engine 210 may identify the tax variables 212 by any suitable method. For example, the recommendation engine 210 may traverse the calculation paths of the tax calculation graph(s) 14 and modify a single node and then determine whether modifying the single node affects the tax result. This can be recursively repeated for each of the nodes of the tax calculation graph(s) 14. In the case that is it known that certain nodes are interconnected by a relationship or function such that multiple nodes need to be modified in order to affect the tax result, the recommendation engine 210 may be configured to modify the multiple nodes together to determine whether such nodes are tax variables 212 which can affect the tax result.

At step 230, the recommendation engine 210 is further configured to analyze the identified tax variables 212 to determine which of the tax variables 212 is controllable by the taxpayer, referred to as taxpayer controllable variables 214. As used herein, the term "controllable" with respect to taxpayer controllable variables 214 means the tax variable is reasonably controllable by the taxpayer based, at least in part, on a controllability model 216, as described below. For instance, some tax variables are more controllable by the taxpayer, such as retirement account contributions, capital gains and losses, and retirement account withdrawals. On the other hand, some tax variables are impracticable or even impossible to control by the taxpayer, such as age, address, and income, or may be undesirable to modify, such as marital status, income, self-employment status, and the like. These examples are only illustrative and are not intended to be limitations on the tax variables and their controllability.

Figure 9:
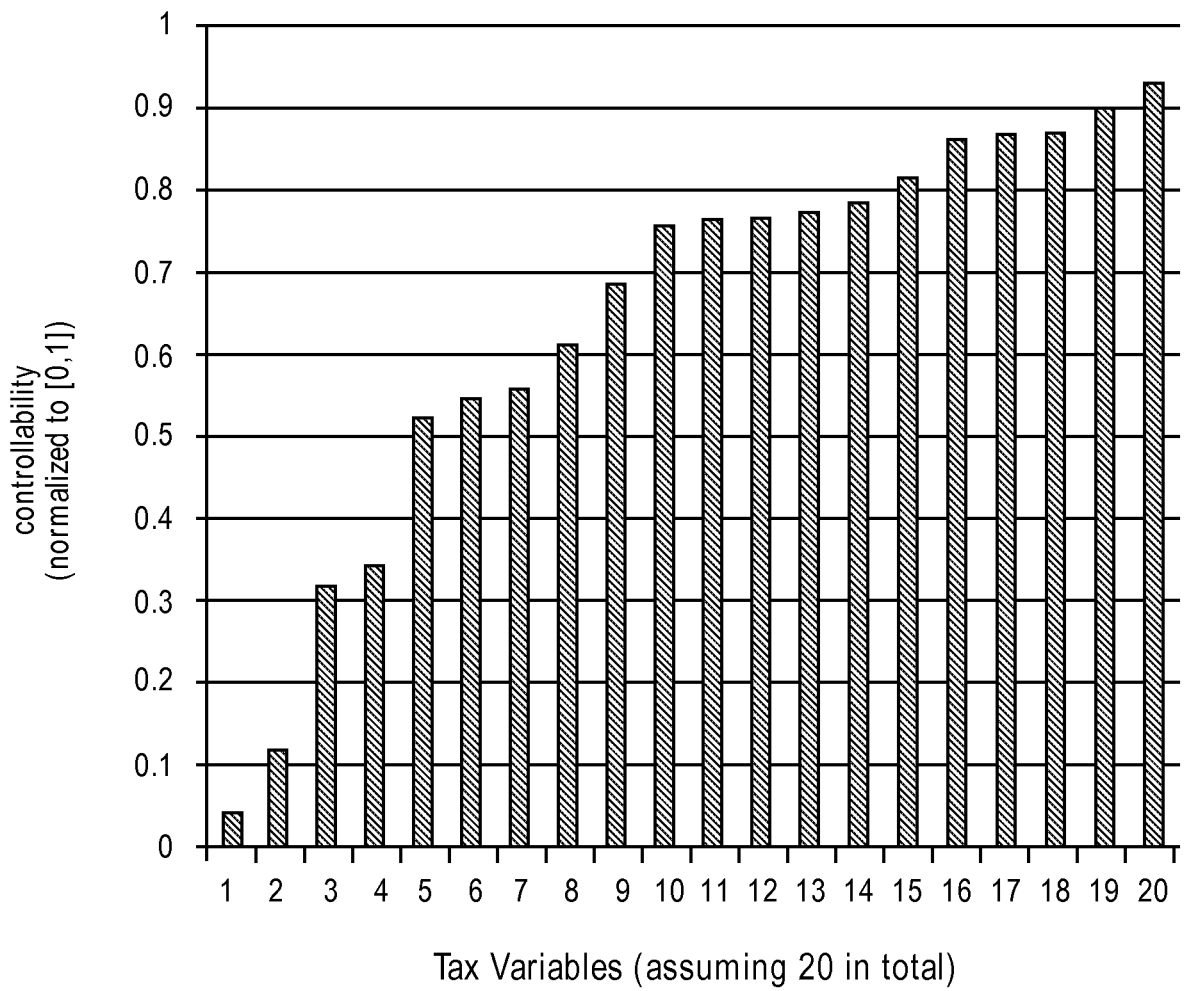
FIG. 9 illustrates a controllability model according to one embodiment.

The recommendation engine 210 utilizes a controllability model 216 to determine which of the tax variables 212 is a taxpayer controllable variable 214. The controllability model 216 may be a chart, formula, table or other model which relates each tax variables to a level of controllability by a taxpayer. As an example, tax variables like retirement account contributions, capital gains and losses, and retirement account withdrawals may be given a high level of controllability, while tax variables like age, address, income, number of children, and number of dependents may be given a low level of controllability. The level of controllability may vary from a high level indicating controllable by all or most taxpayers to a low level indicating impossible for a taxpayer to control, and various levels in-between. Alternatively, the controllability model may simply be binary by assigning each tax variable as either controllable or not controllable. FIG. 9 is a graphic representation of a controllability model 216 in which the X-axis lists the tax variables and the Y-axis indicates the level of controllability by the taxpayer. The controllability model 216 may be a heuristic model developed and modified from empirical data, such as from a database of tax return data, a model based on analysis of each tax variable, or a combination thereof.

Figure 14:
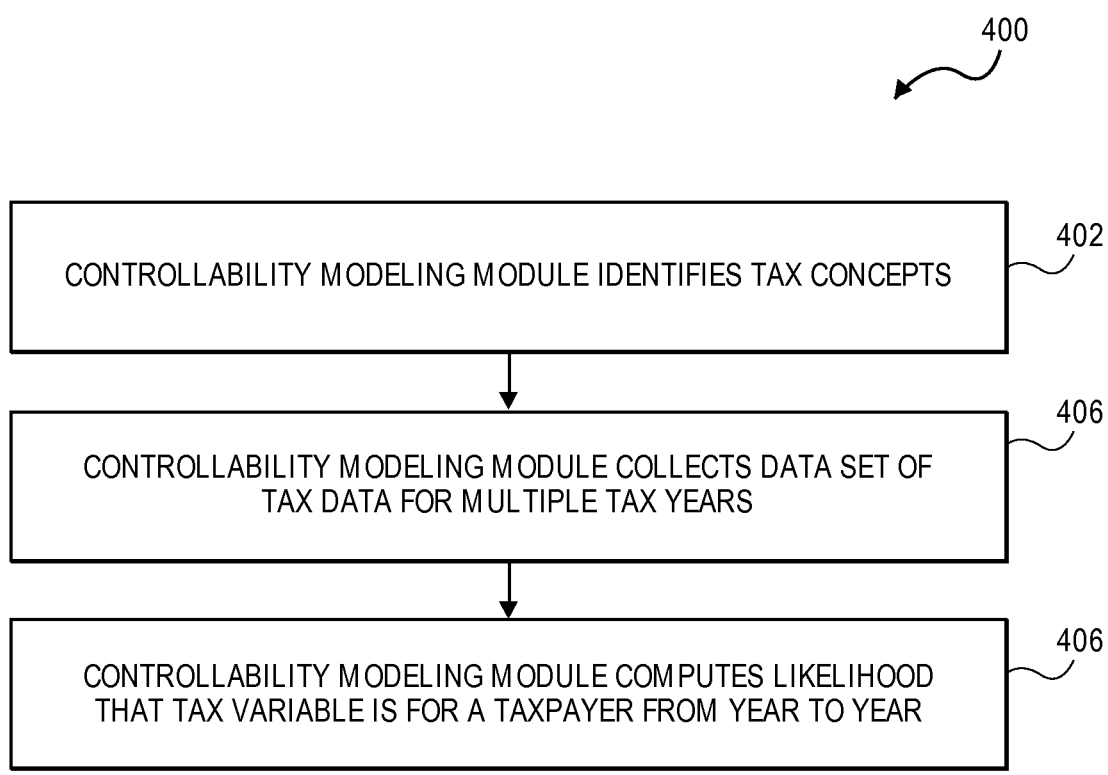
FIG. 14 is a flow chart of a method for computing and generating a controllability model, according to one embodiment.

The controllability model 216 may be generated by, and/or based upon, human analysis, computer analysis of data, or a combination of both. For example, in one embodiment, a controllability modeling module may compute and generate a controllability model using the schema of the system 40 and a database of tax data using the method 400 as shown in the flow chart of FIG. 14. The method 400 may utilize tax data tax data compiled from previously filed tax returns. The controllability modeling module may be a component of the system 40, or it may be a separate and distinct software program. At step 402 of method 400, the controllability modeling module identifies all of the tax concepts that are user inputs, such as by analyzing the calculation graphs 14 and identifying all input nodes 24, which are all of the possible tax variables 212. At step 404, the controllability modeling module collects a data set of tax data for multiple tax years, which may include millions of data profiles (e.g., previously filed tax returns or tax data for previously filed tax returns) for each tax year. At step 406, for each user input, the module computes how likely the tax variable is changed for a taxpayer from a first tax year to the next tax year, such as a ratio of the data profiles having a change in a tax variable from a first tax year to the next tax year over the total number of data profiles for a number of years of tax data.

In one embodiment, the controllability modeling module may determine the ratio by analyzing the data set for the value of a particular tax variable 212 for each of the data profiles and the change in the tax variable 212 for each tax profile from a first tax year to the next tax year. The change may be analyzed for a particular number of tax years, or for all tax years for which data is available, depending on the characteristics of the user input. Then, the module determines how many of the data profiles have a the change in the tax variable 212 from a first tax year to the next tax year. The module then determines the ratio by dividing the number of data profiles having a change in the tax variable by the total number of relevant data profiles. The total number of relevant data profiles may be all of the data profiles analyzed for the particular tax variable. Alternatively, the total number of relevant data profiles may only include those data profiles having a threshold value for the tax variable or the change in the tax variable.

The operation of the controllability modeling module will now be described for the controllability of the tax variable 212 for the "number of dependents" using a hypothetical example. Assume a data set of data profiles having 5 years of tax data for 30 million taxpayers, resulting in 150 million data profiles. For each taxpayer, the controllability modeling module determines the number of changes of the value for the number of dependents from one tax year to the next tax year for each of the five tax years. For instance, for a particular taxpayer, the number of dependents changes from 0 to 1 from tax year 1 to tax year 2, and changes from 1 to 2 from tax year 3 to tax year 4. This results in 2 changes in the tax variable over 5 years. This is repeated for each of the taxpayers (30 million taxpayers in this example). Then, the controllability value for the controllability model 216 is calculated as the total sum of the number of changes divided by the total number of data profiles (150 million in this example). If a threshold is utilized, the denominator for the controllability value is the number of data profiles which have a change in the number of dependents which meets the threshold (or depending on the type of threshold, data profiles of only those taxpayers which meet the threshold).

Alternatively, or in addition to the process described above, the recommendation engine 210 may determine the taxpayer controllable variables 214 by asking the user to identify which of the tax variables 212 is a taxpayer controllable variable 214. The recommendation engine 216 may provide a list of the tax variables 212 to the user, and then the user may select which of the tax variables 212 are taxpayer controllable. The recommendation engine 210 receives the user's selections and identifies (determines) the selected tax variables 212 as taxpayer controllable variables 214.

At step 232, the recommendation engine 210 then determines an effect of the taxpayer controllable variables 214 on the tax result. The recommendation engine 210 determines the effect of the taxpayer controllable variables by executing the tax calculation engine to calculate the tax calculation graph by varying the taxpayer controllable variables 214 and determining the effect on the tax result. In one method, the recommendation engine 210 varies one taxpayer controllable 214 up and down around a known or estimated value while keeping the other variables constant, and then calculating the tax calculation graph(s) 14 to determine the effect on the tax result. The recommendation engine 210 may vary each taxpayer controllable variable 214 according to an adjustability model 218. The adjustability model 218 provides the recommendation engine 210 with the varying values for each of the taxpayer controllable variables 214 to be input into the tax calculation graph(s) 14 to determine the effect on the tax result. The adjustability model 218 relates a distribution range for each of the tax variables 212 to the tax data for the taxpayer and/or typical, average or mean values based on tax data from tax returns for a large sampling of taxpayers. For example, if the taxpayer has a known value for a particular tax variable, the adjustability model 218 will output to the recommendation engine 210 a range of values for each of the taxpayer controllable variables 214 about the known value such that the range includes the most common sampling of values for the tax variable based upon the tax returns for a large sampling of taxpayers. Many of the tax variables will have a bell curve of values from the large sampling of taxpayers, such that the range can be determined by including one, two, three or other number of standard deviations about the known value for the taxpayer. For tax variables in which the taxpayer does not have a known value, the adjustability model 218 provides a range about an average or median value for the tax variable based on the sampling of taxpayers. In addition, the range and number of varying values used for estimated values may be much larger than for known values. For instance, the adustability model 218 may provide 10-20 or more values in a range for a tax variable having a known value for the taxpayer, and 100-300 or more values in a range for a taxpayer controllable variable 214 based on an estimate for taxpayer. The process of step 232 using the adustability model 218 may also be utilized in step 230 for determining which of the tax variables 212 is a user controllable tax variable 214. In other words, the recommendation engine 210 can determine the effect on the tax result in varying the tax variables 212 using the adjustability model 218 to determine which of the tax variables 212 is a user controllable tax variable 214. For example, the recommendation engine 210 can require that the tax variable have a threshold potential effect on the tax result in order to determine that a tax variable 212 is user controllable tax variable At step 234, the recommendation engine 210 may further determine the taxpayer controllable variables 214 by allowing the user to select the taxpayer controllable variables 214 of interest from the taxpayer controllable variables 214 determined as described above. The system 40 provides the taxpayer controllable variables 214 to the user by displaying them to the user, such as in a list, table, etc. The system 40 may provide the taxpayer controllable variables 214 to the user by utilizing the UI control 80 (or components thereof), as described above. The system 40 requests the user to select one or more of the taxpayer controllable variables 214. The user selects the desired taxpayer controllable variables 214, and the system 40 receives the user's selection of one or more of the taxpayer controllable variables 214. This step 234 can be executed before or after determining the effect of the taxpayer controllable variables 214 on the tax result at step 232. If step 234 is executed before step 232, then step 232 is performed using only the user selected taxpayer controllable variables 214. If step 234 is executed after step 232, then the user may have the benefit of narrowing the taxpayer controllable variables 214 before the recommendation engine 210 determines the tax recommendations, as described below. At step 234, the system may also prompt the user to provide a change estimate or prediction of how much each taxpayer controller variable will change. The system receives the selections and/or estimates from the user. The recommendation engine then utilizes only the taxpayer controllable variables selected by the user in executing the tax calculation engine to calculate the tax calculation graph by varying the taxpayer controllable variables to determine an effect on the tax result by varying the taxpayer controllable variables. If provided, the recommendation engine also utilizes the change estimates in determining the effect on the tax result, as described above for step 232.

Still referring to FIG. 8, at step 236, the recommendation engine 210 determines one or more tax recommendations for the taxpayer. The recommendation engine 210 may determine the tax recommendations by utilizing the determined effect on the tax result of each of the taxpayer controllable variables 214 at step 232 and identifying which of the taxpayer controllable variables 214 have the desirable effect on the tax result, such as reducing the total tax owed, reducing the tax payment remaining, and/or increasing the tax refund for the taxpayer. The recommendation engine 210 also determines the range of effect on the tax result over the range used to determine the effect on the tax result in step 232.

The recommendation engine 210 may also generate a tax recommendation item for each tax recommendation, in which the tax recommendation item includes additional data and/or information in addition to the tax recommendation. For example, the tax recommendation item may include meta data, a recommendation excerpt and a confidence score indicating a measure of how likely the tax recommendation is to be implemented by the taxpayer. The meta data may include such data as a recommendation scenario identification (e.g., an identification number or code), the names of the models used to generate the recommendation, additional explanation of the recommendation, hyperlinks to IRS documents or pages of the tax preparation application, etc.).

The confidence score indicates a measure of how likely the tax recommendation is to be implemented by the taxpayer, i.e., how likely the taxpayer will implement the particular tax recommendation. The confidence score is in general determined by a recommendation generation algorithm, and depending on the mathematical model the algorithm applies, there are many ways of determining a confidence score. For example, one simplistic way of determining the confidence score could be based on some expert crafted rules, so that these score are determined by experts in the tax field. The confidence score may be in relative terms, such as low, medium, and high, and so on, or numerical scores, such as on a scale of 0 to 1, with 0 being zero percent confidence and 1 being 100% confidence. A more sophisticated system may utilize an algorithm to determine the confidence score. For example, a taxpayer's tax situation can be clustered with other similar taxpayers, and then it is determined how likely a particular recommendation is taken by that collection of taxpayers. For example, assume the algorithm uses zip-code, age, profession, and AGI as the parameters to cluster the taxpayers. Then, the taxpayer being analyzed may be assigned to a cluster of say 50,000 samples, where each sample represents a tax return. If the recommendation engine 210 is analyzing a tax variable 212 for increasing the taxpayer's charitable donation, the algorithm statistically collects the distribution of charitable donations from all the other taxpayers in the cluster. Assuming the result is represented by a probability distribution function ("PDF") "f," and the taxpayer's donation is an amount "X," then by checking X against f, the algorithm obtains a relative measure of the confidence score of the recommendation to modify the taxpayer's charitable donation. For instance, if X is on the far right end of the curve (i.e. F(X) is almost 1), the confidence score is low because the taxpayer is already making a charitable donation at the high end of the distribution of similar taxpayers. This indicates that recommending the taxpayer to donate more may not be an appealing idea. Contrastingly, if X is located on the far left side (i.e. F(X) is close to 0), the confidence score is high because the taxpayer has a charitable donation that is on the low end of the distribution of similarly situated taxpayers. This indicates that recommending the taxpayer to increase charitable donations is more likely a good idea, and the confidence score is high. Based on these relationships, the algorithm can be used to generate a confidence score for a tax recommendation. In a practical system, the aforementioned PDF can be approximated with one or more Gaussian distributions each with a mean and a variance. Such approximations will make the above computation more intensive during the modeling phase, but much more straightforward during runtime, since the system can leverage the confidence interval which can be derived from the mean and the variance.

In another aspect, at step 238 the system 40 requests and receives from the user a target tax result for the taxpayer. For example, the target tax result may be a specific total tax owed, a specific total remaining tax payment or specific tax refund. This step 238 may be performed at any point in the method 220, but if the target tax result is used in step 236 to determine the tax recommendation, then step 238 must be performed at least prior to step 238. The target tax result may be utilized by the recommendation engine 210 to determine the tax recommendations. The recommendation engine 210 analyzes the user controllable variables 214 and determines values and/or ranges of values for the user controllable variables 214 to obtain the target tax result, or at least come closest to the target tax result. In the case of multiple user controllable variables 214, there may be a target range for each of the user controllable variables which obtains the target tax result. Accordingly, in the case of multiple user controllable variables 214, the recommendation engine 210 may perform a multi-variant analysis. The recommendation engine 210 may determine a midpoint value within a target range for each of the user controllable variables which obtains the target tax result. As described in more detail below, the system 40 may then allow the user to adjust the values of each of the user controllable variables 214 within the target range, and when one of the values is adjusted, the values of the other user controllable variables 214 adjusts accordingly to obtain the target tax result.

At step 240, the recommendation engine 210 (and/or system 40) provides the tax recommendations to the user. In one embodiment, the system 40 may provide the tax recommendations to the user by utilizing the UI control 80 (or components thereof) (see FIG. 7), or in another embodiment described below, by utilizing a recommendation service 211 (see FIG. 15).

Figure 16:
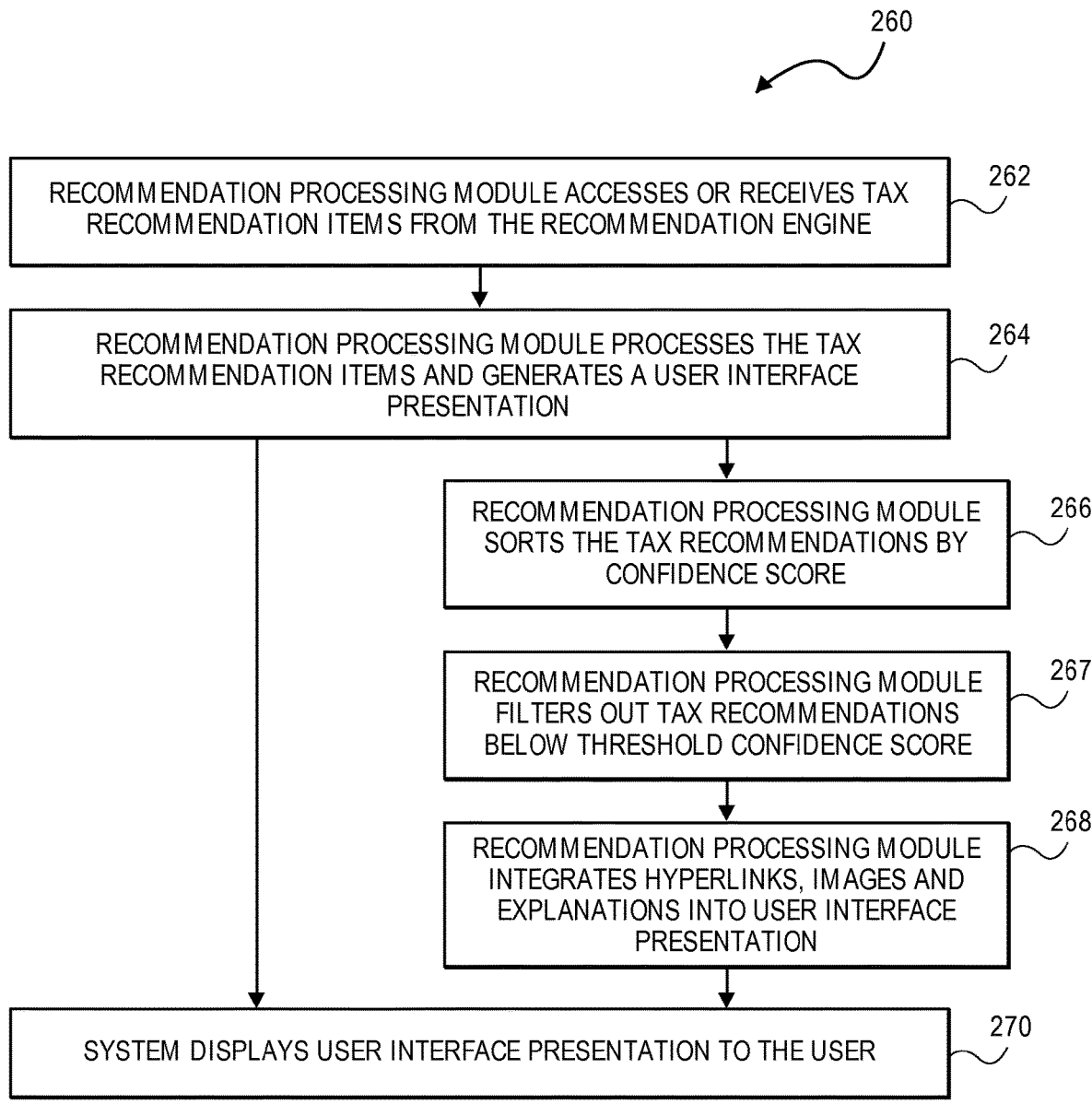
FIG. 16 is a flow chart of a method for providing tax recommendations to a user, according to one embodiment.

For instance, FIG. 16 shows a method 260 for providing the tax recommendations to the user using the user interface manager 82. In this embodiment, the user interface manager 82 includes a recommendation processing module 250 (see FIG. 7). The system 40 provides the tax recommendations to a user by providing the tax recommendations determined at step 236 to the recommendation processing module 250 of the user interface manager 82 of the UI control 80. At step 262, the recommendation processing module 250 accesses or receives the tax recommendation items from the recommendation engine 210. At step 264, the recommendation processing module 250 processes the tax recommendation items and generates an appropriate user interface presentation 84 for displaying the tax recommendations to the user. At step 270, the system 40 then displays the user interface presentation 84 to the user.

In additional features, the recommendation processing module 250 may perform one or more processes on the tax recommendation items in order to generate the user interface presentation. At step 266, the recommendation processing module 250 sorts the tax recommendations by confidence score, such as from lowest confidence score to highest confidence score, or vice versa. In addition, at step 267, the recommendation processing module 250 may filter out tax recommendations having a confidence score below a threshold value. This can reduce the number of tax recommendations provided to the user by ignoring tax recommendations which have a low confidence score, i.e. they are not likely to be implemented by the taxpayer. At step 268, the recommendation processing module 250 may also integrate one or more of hyperlinks, images and explanations of the tax recommendations into the user interface presentation 84. For example, at step 242 of method 220, the system 40 may generate explanations which provide one or more of a description of the tax recommendation, how it applies to the taxpayer, and how it can improve the taxpayer's tax return.

Figure 15:
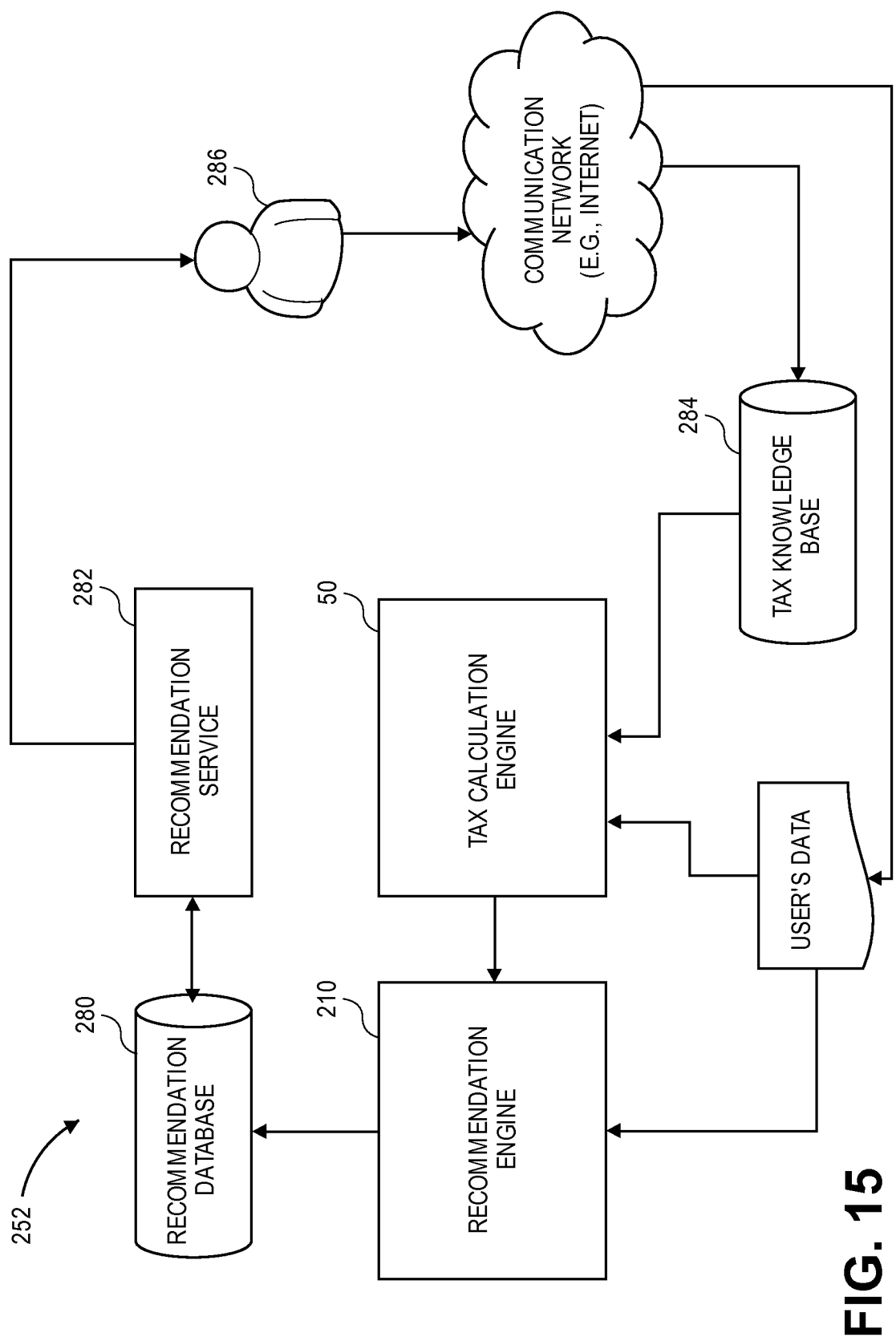
FIG. 15 is a schematic diagram of a tax recommendation system or subsystem for providing tax recommendations to a user, according to one embodiment.
Figure 17:
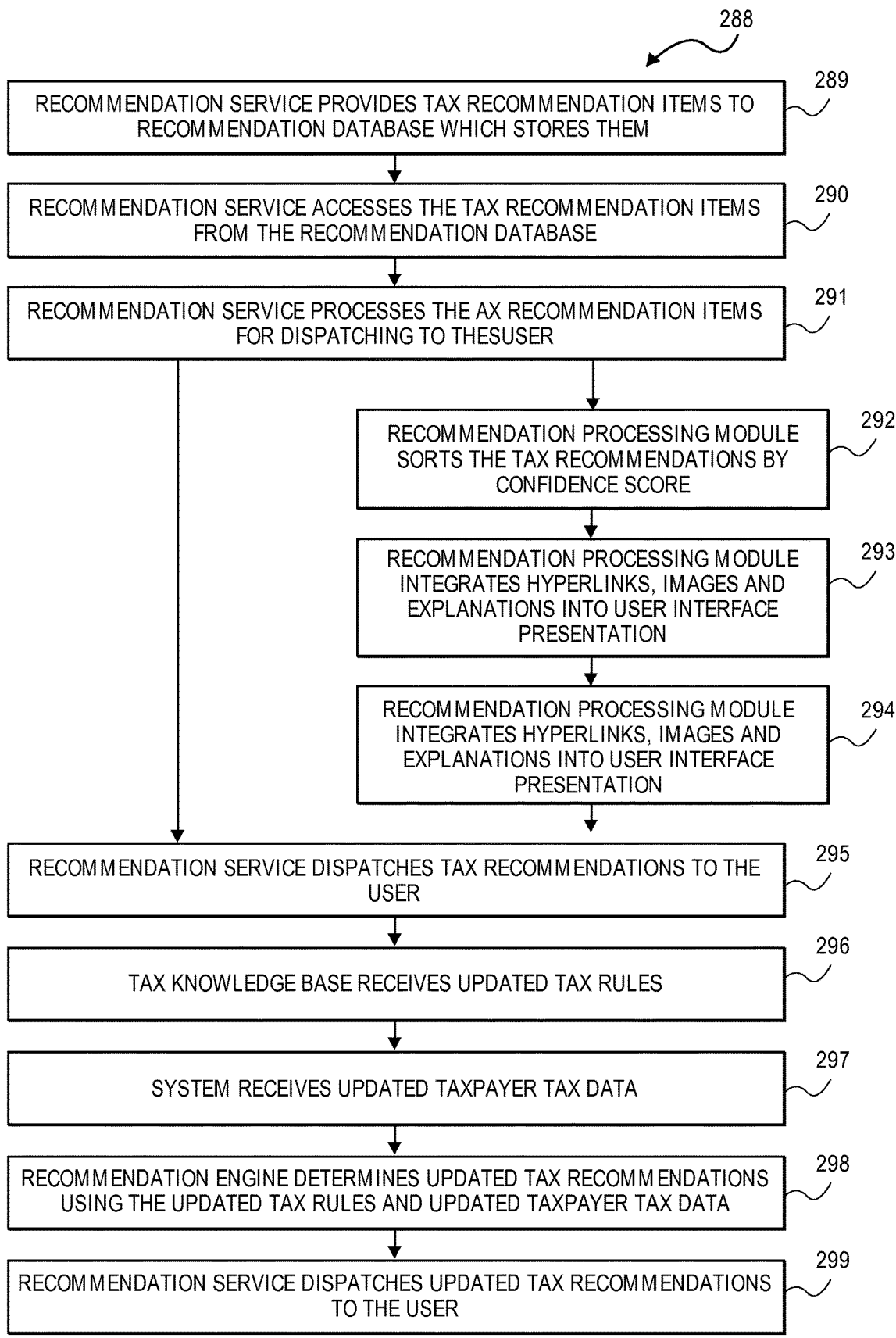
FIG. 17 is a flow chart of a method for providing tax recommendations using the system of FIG. 15, according to one embodiment.

In another embodiment, FIG. 17 shows a method 288 in which the tax recommendations are provided to the user in a year round recurring, updating process which updates the tax recommendations based on updates to a taxpayer's tax data profile and/or updates to a tax knowledge base based on changes in the tax laws and tax codes. Referring now to FIG. 15, a schematic diagram of a tax recommendation system 252 (or subsystem 252) for providing recurring, updated tax recommendations is shown. The tax recommendation system 252 may be a stand-alone system which is operably coupled to the tax preparation system 40, or it may be a subsystem of the tax preparation system 40 which utilizes the common components shown in FIG. 7 (in which same or like components have the same reference number). For example, as shown in FIG. 7, the recommendation service 282, recommendation database 280, and tax knowledge base 284 may be components of the tax preparation system 40. Still, in other embodiments (e.g., see FIG. 15), the recommendation service 282, recommendation database 280 and/or tax knowledge base 284 may be components separate from the system 40, but in operable communication with the system 40 through appropriate communication networking. The recommendation database 280 and the recommendation service 282 are in operable communication such as through a communication network.

Referring to FIGS. 15 and 17, at step 289, the recommendation engine 210 provides the tax recommendations items to the recommendation database 280. The recommendation database 280 stores the tax recommendations. At step 290, the recommendation service 282 accesses the tax recommendation items from the recommendation database 280. Then, at step 291, the recommendation service 282 processes the tax recommendation items for dispatching to the user. At step 295, the recommendation service dispatches the tax recommendations to the user 286. Similar to the recommendation processing module 250 of the user interface manager 82, the recommendation service 282 may be configured to generate an appropriate user interface presentation 84 for displaying the tax recommendations to the user. The recommendation service 282 is configured to dispatch the tax recommendations to the user by any suitable means, such as via email, text message, mobile application, an alert or reminder regarding the tax recommendations or deadlines regarding the tax recommendations.

At step 296, the tax knowledge base 284 receives updated tax rules and the system 40 updates the tax calculation graph(s) 14 and other components, such as the completion graph(s) 12 to reflect the updated tax rules. The updated tax rules may be received from any suitable source, such as the relevant tax agency, a tax law update service, or other source. At step 297, the system 40 also receives updated taxpayer tax data, such as updates to the taxpayer's tax situation, and/or feedback regarding the taxpayer implementing one or more of the tax recommendations. The updated taxpayer tax data may be received and/or accessed from any suitable source, such as a user inputting the data using the system 40, the system 40 automatically accessing the updated taxpayer tax data from a database having taxpayer tax data, such as databases for financial accounts of the taxpayer, a personal finance management application, or other suitable source.

At step 298, the recommendation engine 210 determines updated tax recommendations and generates updated tax recommendation items for each updated tax recommendation based at least in part on the updated tax rules and/or updated taxpayer tax data, such as feedback regarding the taxpayer implementing one or more of the tax recommendations.

At step 299, the recommendation service 282 provides the updated tax recommendations to the user, same or similar to step 294.

Similar to the recommendation processing module 250, the recommendation service 282 may perform one or more processes on the tax recommendation items in order to provide the tax recommendations to the user and/or generate the user interface presentation 84. At step 291, the recommendation service 282 sorts the tax recommendations by confidence score, such as from lowest confidence score to highest confidence score, or vice versa. In addition, at step 292, the recommendation service 282 may filter out tax recommendations having a confidence score below a threshold value. This can reduce the number of tax recommendations provided to the user by ignoring tax recommendations which have a low confidence score, i.e. they are not likely to be implemented by the taxpayer. At step 293, the recommendation processing module 250 may also integrate one or more of hyperlinks, images and explanations of the tax recommendations into the user interface presentation 84. The explanations may be generated at step 242 of method 220. The explanations provide one or more of a description of the tax recommendation, how it applies to the taxpayer, and how it can improve the taxpayer's tax return.

Figure 10:
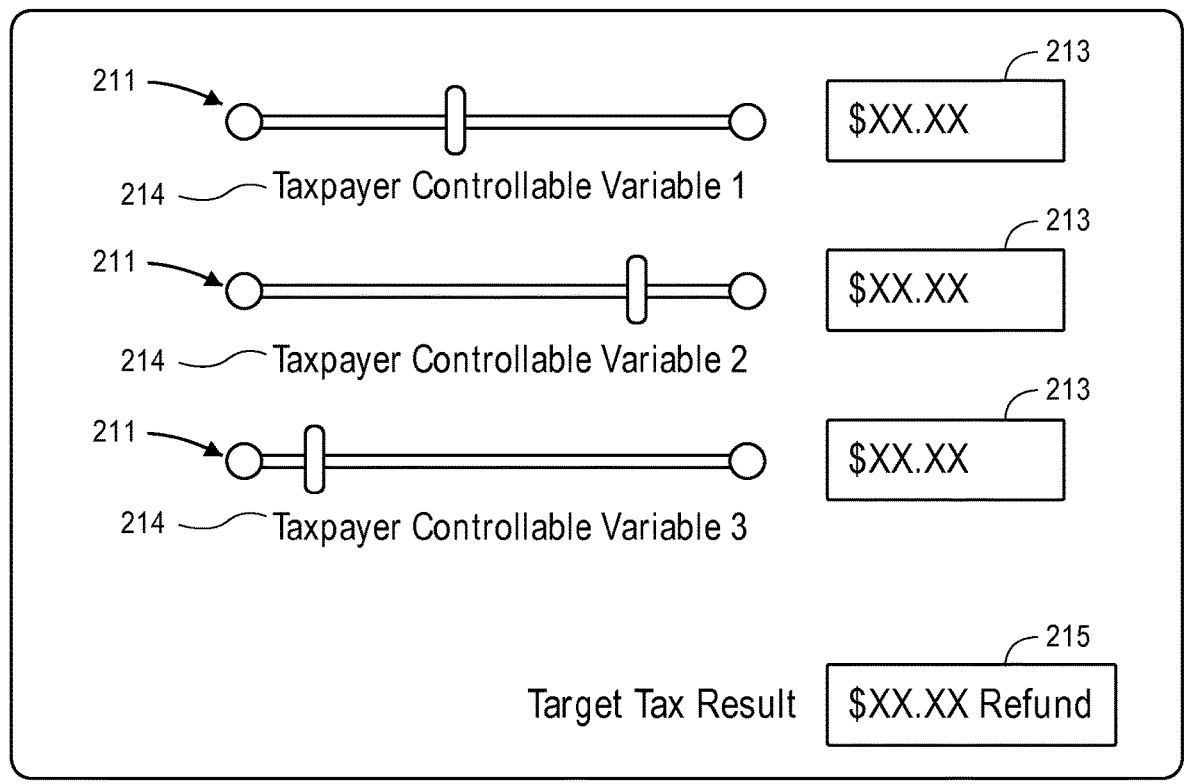
FIG. 10 illustrates a display for providing tax recommendations using slider input value controls for adjusting the values of user controllable variables according to one embodiment.

In any of the embodiments for providing the tax recommendations to the user as described above, the tax recommendations may be provided to the user in the form of adjustable input value controls 211 (see FIG. 10). The input value controls 211 identify the taxpayer controllable tax variable 214, a recommended value 213 for the taxpayer controllable tax variable 214, and a control for adjusting the input value for the taxpayer controllable tax variable. As shown in FIG. 10, the input value control 211 may be a slider 211 which the user can slide left or right (or up or down, depending on the desired configuration) to adjust the input value for the respective taxpayer controllable variable 214. In the case of target tax result as described, when one of the sliders 211 is adjusted to adjust the input value for one of the taxpayer controllable variables 214, the values and sliders 211 for one or more of the other taxpayer controllable variables 214 may also adjust to obtain the target tax result 215. The sliders 211 may also have a selectable lock 217 to lock the slider 211 from adjusting when one of the other sliders 211 is adjusted. This way, the user can set one or more of the values for the taxpayer controllable variables 214 on the sliders 211 and the recommendation engine 210 will only vary the unlocked taxpayer controllable variables 214 to obtain the target tax result 215.

In additional aspects, the tax preparation system 40 may also be configured to assist the user (e.g. taxpayer) in implementing the tax recommendations. As an example, if a recommendation includes modifying the taxpayer's tax withholding or estimated tax payments, the system 40 asks the user whether the user to schedule revised estimated tax payments to be made from a financial account of the taxpayer at a financial institution, or complete and submit a new form for withholding tax (e.g. form W-4 for U.S. federal withholding tax). When the user selects to schedule estimated tax payment(s) from a financial institution, the system 40 requests the financial account information for making the payment(s), and the date(s) for the payment(s). The system 40 then processes the scheduled estimated tax payments, by any suitable means, such as ACH payments, or other electronic payment system. When the user selects to submit a new withholding form, the system 40 may compute and complete a withholding form for the taxpayer. The system 40 may use the tax recommendation, as well as any required tax data from the shared data store to compute any schedules and/or worksheets for preparing a withholding form. The system 40 fills in the withholding form and provides it to the user for submission by the taxpayer (usually to the employer or payroll service) or the system may obtain information for submitting the form and submit the withholding form on behalf of the taxpayer.

Encapsulating the tax code and regulations within calculation graphs 14 results in much improved testability and maintainability of the tax preparation software 100. Software programming errors ("bugs") can be identified more easily when the calculation graphs 14 are used because such bugs can be traced more easily. In addition, updates to the calculation graphs 14 can be readily performed with less effort when tax code or regulations change.

Figure 11:
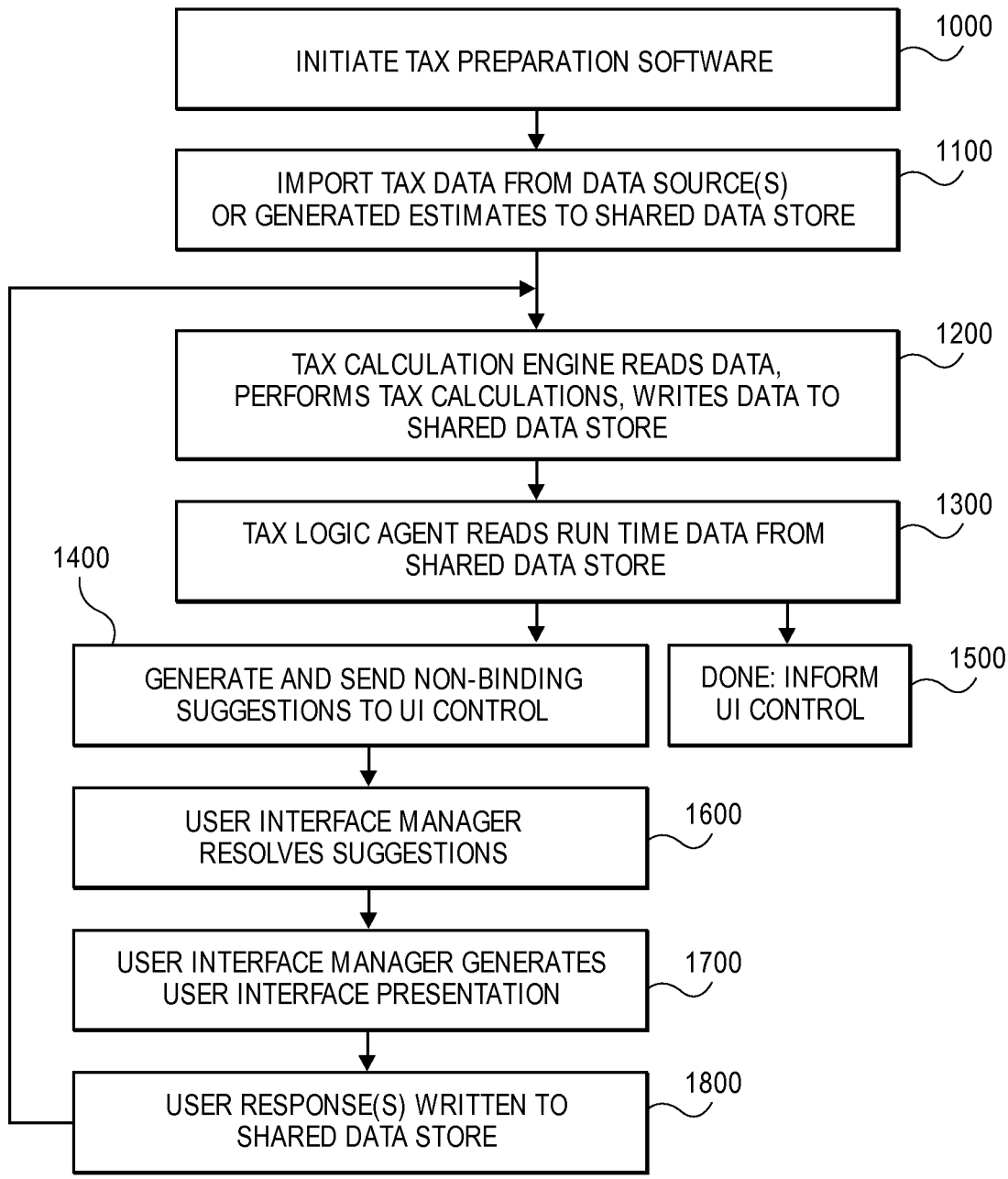
FIG. 11 is a flow chart of a method for preparing an electronic tax return and determining tax recommendations according to one embodiment.

Referring now to FIG. 11, a flow chart showing one illustrative method for preparing a tax return and/or obtaining tax recommendations using the tax preparation system 40, according to one embodiment of the invention. In operation of the system 40 to prepare a tax return and/or obtain tax recommendations, at step 1000, a user initiates the tax preparation software 100 on a computing device 102, 103 as seen, for example, in FIG. 12. The tax preparation software 100 may reside on the actual computing device 102 that the user interfaces with or, alternatively, the tax preparation software 100 may reside on a remote computing device 103 such as a server or the like as illustrated. In such instances, the computing device 102 that is utilized by the user or tax payer communicates via the remote computing device 103 using an application 106 contained on the computing device 102. The tax preparation software 100 may also be run using conventional Internet browser software. Communication between the computing device 102 and the remote computing device 103 may occur over a wide area network such as the Internet. Communication may also occur over a private communication network (e.g., mobile phone network).

At step 1100, the tax preparation system executes the tax preparation software 100 to gather and/or import tax related information from one or more data sources 48. Tax data may also be input manually with user input 48a.

At step 1200, the tax calculation engine 50 computes one or more tax calculation graphs dynamically based on the then available data at any given instance within the schema 44 in the shared data store 42. In some instances, estimates or educated guesses may be made for missing data. Details regarding how such estimates or educated guesses are done maybe found in U.S. patent application Ser. No. 14/448,986 which is incorporated by reference as if set forth fully herein.

At step 1300, the tax logic agent 60 reads the run time data 62 which represents the instantiated representation of the canonical tax schema 44 at runtime.

At step 1400, the tax logic agent 60 then utilizes the decision tables 30 (or modified completeness model(s) or modified decision table(s)) to generate and send non-binding suggestions 66 to the UI control 80. Alternatively, at step 1500, the tax logic agent 60 may determine that completeness has been achieved across the tax topics in which case a done instruction may be delivered to the UI control.

If not done, at step 1600, the process continues whereby the user interface manager 82 will then process the suggestion(s) 66 using the suggestion resolution element 88 for resolving of how to respond to the incoming non-binding suggestions 66. At step 1700, the user interface manager 82 then generates a user interface presentation 84 to the user whereby the user is presented with one or more prompts. The prompts may include questions, affirmations, confirmations, declaratory statements, and the like. The prompts are displayed on a screen 104 of the computing device 102 whereby the user can then respond to the same by using one or more input devices associated with the computing device 102 (e.g., keyboard, mouse, finger, stylus, voice recognition, etc.).

At step 1800, the response or responses that are given by the user of the tax preparation software 100 are then written back to the shared data store 42 to thereby update all appropriate fields of the schema 44. The process then continues with operation 1200 and proceeds as explained above until a completeness state has been reached and a done instruction is sent to the UI control 80.

Figure 13:
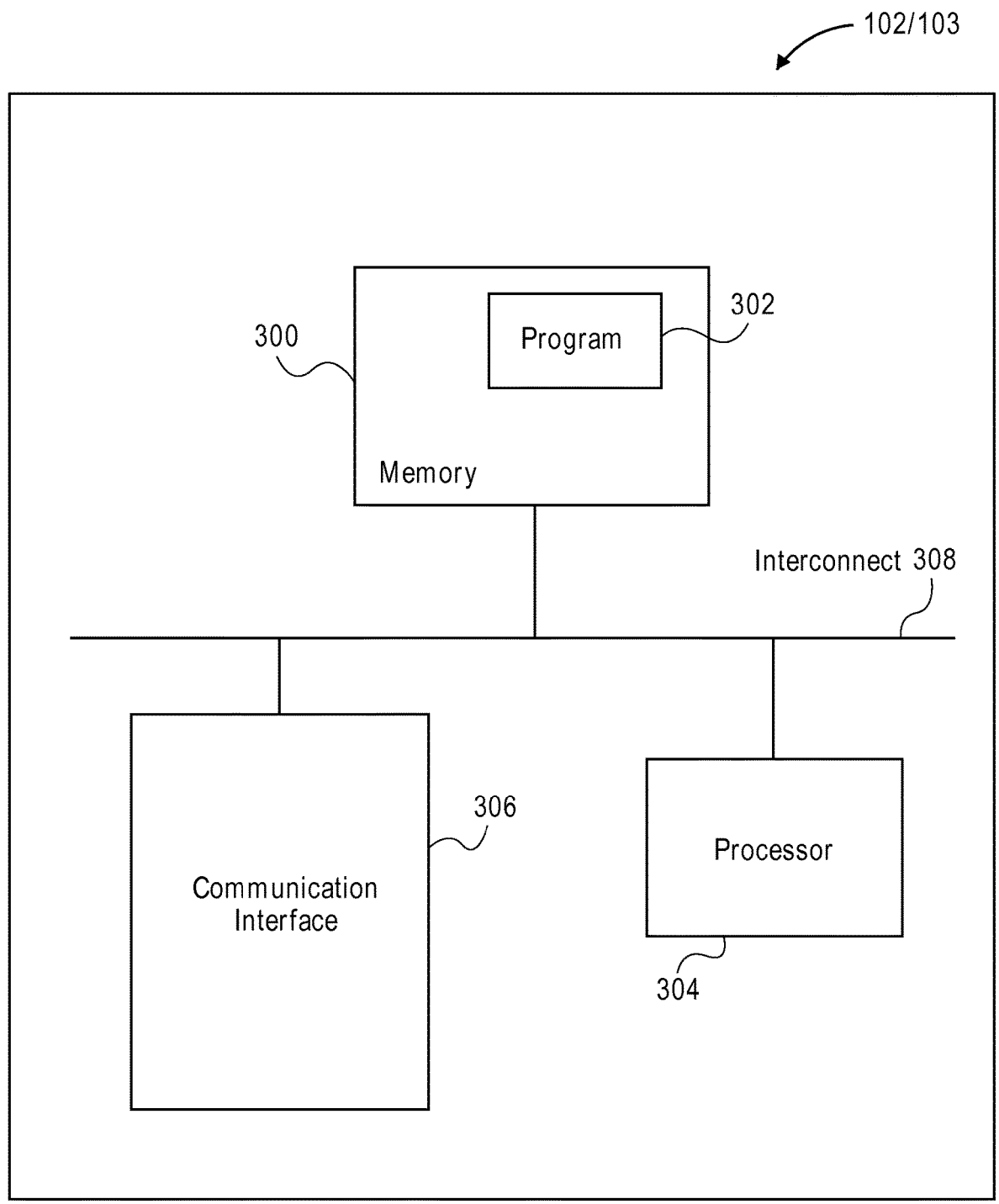
FIG. 13 illustrates generally the components of a computing device that may be utilized to execute the software for automatically calculating or determining tax liability, performing an estimated tax payments function, and/or preparing a tax return based thereon, according to the embodiments of the invention.

The tax preparation system 40 may at any time execute the tax recommendation function, when initiated as described above. When initiated, the system 40 executes the method 220 as described above FIG. 13 generally illustrates components of a computing device 102, 103 that may be utilized to execute the software for automatically calculating or determining tax liability and preparing an electronic or paper return based thereon, as well as performing the tax recommendation method 220. The components of the computing device 102 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 13 is provided to generally illustrate how embodiments may be configured and implemented.

The described embodiments of the present invention, including the functions performed by the system 40 and its components, including the tax recommendation engine 210, may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computer-implemented method, comprising:
    a computerized tax return preparation software application comprising computer executable instructions stored in a memory of a computer and executed by a computer processor of the computer, storing, by a shared data store of the computerized tax return preparation application, taxpayer-specific tax data, the tax return preparation software application having a modular architecture comprising a tax calculation engine, a completeness model comprising at least one decision table, a tax logic agent, a recommendation engine, and a user interface controller including a user interface manager loosely coupled to the tax logic agent;
    the computerized tax return preparation application, by the tax calculation engine, reading the taxpayer-specific tax data from the shared data store and navigating a tax calculation graph using the taxpayer-specific tax data to determine a result, the tax calculation graph comprising a plurality of nodes including one or more of input nodes, functional nodes, and function nodes and a plurality of calculation paths,
        wherein each calculation path connects a plurality of nodes which are data dependent such that a node is connected to another node if the node depends on execution of the other node, and
        wherein each input node is populated with taxpayer-specific tax data, each function node defines a tax calculation utilizing the populated input nodes, and each functional node is a result of a calculation performed by an interconnected function node;
    the computerized tax return preparation system, by the tax logic agent, generating one or more non-binding suggestions for questions necessary to complete a tax return based on the completeness module and transmitting the one or more non-binding suggestions to the user interface controller;
    the computerized tax return preparation system, by the user interface manager of the user interface controller, determining whether to process each of the one or more non-binding suggestions received from the tax logic agent and, for the one or more non-binding suggestions that the user interface manager has determined to process, presenting one or more questions to the user on a display of the computer in a manner and at a time determined by the user interface manager;
    the computerized tax return preparation application, by the recommendation engine in communication with the tax calculation engine and the user interface controller, analyzing the tax calculation graph and determining variables which can affect the result for the user, analyzing the variables to determine one or more controllable variables which are variables that the user of the computerized tax return preparation application can control through a computer generated user interface,
        wherein determining the user controllable variables is based at least in part on using a controllability model relating each of the variables to levels of user controllability, analyzing an effect on the results, and determining one or more recommendations for the user;
    receiving, by the user interface controller, the one or more recommendations;
    generating, by the user interface controller, a user interface comprising the one or more recommendations; and
    presenting to the user, by the user interface controller through a display of the computer, the user interface comprising the one or more recommendations.

2. The method of claim 1, wherein the controllability model is an heuristic model.

3. The method of claim 1, further comprising:
    the user interface requesting the user to select one or more of the user controllable variables; and
    the computerized tax return preparation application, by the user interface controller, receiving a selection of the one or more of the user controllable variables from the user through the user interface,
    wherein the tax calculation engine navigates the tax calculation graph by varying the user controllable variables to determine an effect on the result by varying the user controllable variables utilizing only the user controllable variables selected by the user through the user interface.

4. The method of claim 1, wherein executing the recommendation engine to analyze the calculation graph to determine variables which can affect the result of the user comprises:
    the computerized tax return preparation application, by the recommendation engine, traversing a plurality of tax calculation paths of the tax calculation graph and identifying one or more calculation paths which can affect the result; and
    the computerized tax return preparation application, by the recommendation engine, identifying input nodes on the calculation paths which can affect the result as user controllable variables.

5. The method of claim 1, the user interface comprising one or more adjustable input value controls in which each input value control is configured to allows the user to adjust input values for controllable variables;
    the computerized tax return preparation application, by the recommendation engine and through the user interface controller, receiving an adjusted input value for one or more of the user controllable variables based on the user adjusting the one or more adjustable input value controls;
    the computerized tax return preparation application, by the tax calculation engine, navigating the tax calculation graph using the adjusted values for the user controllable variables resulting in a modified tax result; and
    the computerized tax return preparation application, by the user interface controller, presenting the modified result to the user through the display of the computer.

6. The method of claim 5, wherein each of the one or more input value controls of the user interface is a control selected from the group consisting of a slider, and a fillable text field.

7. The method of claim 1, further comprising:
the computerized tax return preparation application, by the recommendation engine and through the user interface controller, receiving a target tax result for the user; and
computerized tax return preparation application, by the recommendation engine, determining the one or more recommendations for the user by adjusting one or more of the user controllable variables to achieve the target tax result.

8. The method of claim 7, further comprising:
the computerized tax return preparation application, by the recommendation engine and through the user interface controller, presenting the recommendations to the user through the display of the computer by providing values for the one or more user controllable variables utilized to achieve the target tax result.

9. A computing system comprising:
a shared data store of a computerized tax return preparation application comprising computer-executable instructions stored in a memory of a computing device and executable by a processor of the computing device, the shared data store being configured to store taxpayer-specific electronic tax data, the tax return preparation software application having a modular architecture and comprising a tax calculation engine in communication with the shared data store, wherein the tax calculation engine is configured to use a completeness model comprising at least one decision table and comprising a plurality of nodes including one or more of input nodes, functional nodes, and function nodes and a plurality of calculation paths,
wherein each calculation path connects a plurality of nodes which are data dependent such that a node is connected to another node if the node depends on execution of the other node,
wherein each input node is populated with taxpayer-specific tax data, each function node defines a tax calculation utilizing the populated input nodes, and each functional node is a result of a calculation performed by an interconnected function node; and
a tax logic agent configured to generate one or more non-binding suggestions for questions necessary to complete a tax return based on the completeness module and to transmit the one or more non-binding suggestions to the user interface controller;
a user interface controller including a user interface manager loosely coupled to the tax logic agent and in communication with the shared data store, the user interface controller being configured to present a computer-generated interview screen to a user of the computerized tax return preparation application through a display of the computing device;
a recommendation engine in communication with and between the user interface controller and the tax calculation engine,
wherein the recommendation engine is detached from the tax calculation engine;
the tax calculation engine being configured to read the taxpayer-specific tax data from the shared data store, to navigate the tax calculation graph using the taxpayer-specific data read from the shared data store, to perform a plurality of tax calculation operations based on the tax calculation graph, to obtain a result based on the navigation of the calculation graph, and to write the result to the shared data store;
the recommendation engine being configured to:
analyze the calculation graph to determine variables which can affect the result;
analyze the variables to determine one or more user controllable variables based at least in part upon a controllability model relating each of the variables to a level of user controllability;
execute the tax calculation engine to navigate the tax calculation graph while varying the controllable variables to determine an effect on the result; and
analyze the effect on the result and determine one or more recommendations for the user; and
the user interface controller being configured to receive the one or more recommendations, to generate a user interface comprising the one or more recommendations, to present the user interface to the user through the display of the computing device, to determine whether to process each of the one or more non-binding suggestions received from the tax logic agent and, in response to determining to process any of the one or more non-binding suggestions, to present one or more questions to a-the user on the display of the computing device in a manner and at a time determined by the user interface manager.

10. The system of claim 9,
wherein the controllability model is an heuristic model.

11. The system of claim 9,
the user interface controller being configured to request the user to select one or more of the controllable variables and to receive a selection of the one or more of the controllable variables through the user interface;
wherein the recommendation engine is configured to navigate the tax calculation graph by the recommendation engine varying only the controllable variables selected by the user to determine an effect on the result by varying the controllable variables.

12. The system of claim 1,
wherein the recommendation engine of the computerized tax return preparation application is configured to analyze the calculation graph to determine variables which can affect the result by:
traversing a plurality of calculation paths of the tax calculation graph and identifying one or more calculation paths which can affect the result; and
identifying input nodes on the calculation paths which can affect the result as user controllable variables.

13. The system of claim 1, the computer generated interface comprising one or more adjustable input value controls in which each input value control is configured to allow the user to adjust the input value for a taxpayer controllable variable;
receive an adjusted input value for one or more of the controllable variables based on the user adjusting the one or more adjustable input value controls through the interview screen and utilizing the computing device;
navigate, by execution of the tax calculation engine, the tax calculation graph using the adjusted values for the controllable variables resulting in a modified result; and
display, by the user interface controller, the modified result to the user.

14. The system of claim 13,
wherein each of the one or more adjustable input value controls of the user interface is a control selected from the group consisting of a slider, and a fillable text field.

15. The system of claim 9,
wherein the recommendation engine is configured to:
receive, through the user interface controller, a target result for the user; and determine the one or more recommendations for the user by adjusting one or more of the user-controllable variables to achieve the target tax result.

16. An article of manufacture comprising a non-transitory computer program carrier readable by a computer and embodying instructions of a computerized tax return preparation application executable by the computer to program a computer to perform a process, the tax return preparation software application having a modular architecture comprising a shared data store, a tax calculation engine, a completeness model comprising at least one decision table, a tax logic agent, a recommendation engine, and a user interface controller including a user interface manager loosely coupled to the tax logic agent, the process comprising:

storing, by the shared data store of the computerized tax return preparation application, taxpayer-specific tax data;

reading, by the tax calculation engine, the taxpayer-specific tax data from the shared data store and navigating a tax calculation graph using the taxpayer-specific tax data to determine a result, the tax calculation graph comprising a plurality of nodes including one or more of input nodes, functional nodes, and function nodes and a plurality of calculation paths, wherein each calculation path connects a plurality of nodes which are data dependent such that a node is connected to another node if the node depends on execution of the other node, wherein each input node is populated with taxpayer-specific tax data, each function node defines a tax calculation utilizing the populated input nodes, and each functional node is a result of a calculation performed by an interconnected function node;

analyzing, by the recommendation engine of the computerized tax return preparation application the tax calculation graph;

determining, by the recommendation engine, variables which can affect the result;

analyzing, by the recommendation engine, the variables to determine one or more controllable variables which are variables that a user of the computerized tax return preparation application can control through a computer generated interview screen, the recommendation engine determining the user controllable variables based at least in part on using a controllability model relating each of the variables to levels of user controllability;

the computerized tax return preparation system, by the tax logic agent, generating one or more non-binding suggestions for questions necessary to complete a tax return based on the completeness module and transmitting the one or more non-binding suggestions to the user interface controller;

the computerized tax return preparation application, by the recommendation engine, executing the tax calculation engine to navigate the tax calculation graph by varying the user controllable variables to determine an effect on the tax result by varying the user controllable variables;

the computerized tax return preparation application, by the recommendation engine, analyzing the effect on the result and determining one or more recommendations for the user;

receiving, by the user interface controller, the one or more recommendations;

generating, by the user interface controller, the one or more recommendations to the user;

presenting, by the user interface controller, the user interface to the user through a display of the computer; and the computerized tax return preparation system, by the user interface manager of the user interface controller, determining whether to process each of the one or more non-binding suggestions received from the tax logic agent and, for the one or more non-binding suggestions that the user interface manager has determined to process, presenting one or more questions to a user via a graphical user interface displayed on the display of the computer in a manner and at a time determined by the user interface manager.

17. The article of claim 16, wherein the controllability model is an heuristic model.

18. The article of claim 16, the process further comprising:

the user interface requesting the user to select one or more of the controllable variables;

the computerized tax return preparation application, by the user interface controller, receiving a selection of one or more of the controllable variables by the user through the interview screen, navigating, by the recommendation engine executing the tax calculation engine, the tax calculation graph by varying the taxpayer controllable variables in order to determine the effect of varying only the controllable variables selected by the user on the result.

19. The article of claim 18, wherein navigating, by the recommendation engine, further comprises:

the recommendation engine traversing a plurality of tax calculation paths of the tax calculation graph and identifying one or more calculation paths which can affect the tax result; and he recommendation engine identifying input nodes on the calculation paths which can affect the tax result as taxpayer controllable variables.

20. The article of claim 16, wherein the process further comprises:

the recommendation engine providing the recommendations to the user in the form of one or more adjustable input value controls in which each input value control is configured to allow the user to adjust an input value for a taxpayer controllable variable;

the recommendation engine receiving an adjusted input value for one or more of the taxpayer controllable variables based on the user adjusting the one or more adjustable input value controls;

the tax calculation engine navigating the tax calculation graph using the adjusted values for the controllable variables resulting in a modified tax result; and the user interface controller presenting the modified result to the user through the display of the computer.

21. The article of claim 20, wherein each of the one or more input value controls is a control presented on the user interface and is a slider or a fillable text field.

22. The article of claim 16, wherein the process further comprises:

the computerized tax return preparation application, by the recommendation engine and through the interface controller, receiving a target result for the user; and the computerized tax return preparation application, by the recommendation engine, determining the one or more recommendations for the user by adjusting one or more of the user controllable variables of the user interface to achieve the target tax result.

* * * * *